(12) United States Patent
Lee et al.

(10) Patent No.: US 10,578,925 B2
(45) Date of Patent: Mar. 3, 2020

(54) LIQUID CRYSTAL DISPLAY DEVICE AND METHOD FOR MANUFACTURING THE SAME

(71) Applicant: Samsung Display Co., Ltd., Yongin-si (KR)

(72) Inventors: Hyeok Jin Lee, Seongnam-si (KR); Oh Jeong Kwon, Hwaseong-si (KR); Jae Bum Cho, Seoul (KR); Ka Eun Kim, Yongin-si (KR); Su Jin Kim, Seoul (KR); Ki Chul Shin, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 399 days.

(21) Appl. No.: 15/354,875

(22) Filed: Nov. 17, 2016

(65) Prior Publication Data

US 2017/0139280 A1 May 18, 2017

(30) Foreign Application Priority Data

Nov. 18, 2015 (KR) ........................ 10-2015-0161761

(51) Int. Cl.
*G02F 1/1337* (2006.01)
*C09K 19/56* (2006.01)
*G02F 1/1341* (2006.01)

(52) U.S. Cl.
CPC ........ *G02F 1/133723* (2013.01); *C09K 19/56* (2013.01); *G02F 1/1341* (2013.01);
(Continued)

(58) Field of Classification Search
CPC ............... C09K 19/56; G02F 1/133723; G02F 1/133788; G02F 1/1341;
(Continued)

(56) References Cited

U.S. PATENT DOCUMENTS

| 2008/0013292 A1* | 1/2008 | Slikkerveer ........... G06F 1/1601 361/749 |
| 2010/0128214 A1* | 5/2010 | Lee .................. G02F 1/133788 349/130 |

(Continued)

FOREIGN PATENT DOCUMENTS

| KR | 10-2015-0012093 | 2/2015 |
| KR | 10-2015-0040616 | 4/2015 |

(Continued)

*Primary Examiner* — Sophie Hon
(74) *Attorney, Agent, or Firm* — H.C. Park & Associates, PLC

(57) ABSTRACT

A liquid crystal display device includes a first substrate, a first alignment film disposed on the first substrate, a second substrate, and a liquid crystal layer disposed between the first alignment film and the second substrate. The first substrate has a surface curved in a first direction and the second substrate has a surface curved in the first direction. The first alignment film includes a polymerization initiator and a polymer chain that is a copolymer of a dianhydride-based compound and a diamine-based compound. The polymer chain includes a main chain including a repeating unit including an imide group, a first side chain, including a vertical align group, bonded to the main chain, and a second side chain bonded to the main chain. The functional group includes a biphenyl group or a terphenyl group.

20 Claims, 12 Drawing Sheets

(52) U.S. Cl.
CPC ............ *G02F 1/133788* (2013.01); *G02F 2001/133746* (2013.01); *G02F 2201/121* (2013.01); *G02F 2201/123* (2013.01); *Y10T 428/1023* (2015.01)

(58) Field of Classification Search
CPC ... G02F 2001/133746; G02F 1/133707; Y10T 428/1018; Y10T 428/1023
See application file for complete search history.

(56) References Cited

U.S. PATENT DOCUMENTS

| | | | |
|---|---|---|---|
| 2011/0261278 A1* | 10/2011 | Oh ................ | G02F 1/133723 349/48 |
| 2012/0092603 A1* | 4/2012 | Mizusaki ............ | C08F 20/20 349/129 |
| 2012/0218500 A1* | 8/2012 | Nakamura ....... | G02F 1/133711 349/128 |
| 2012/0224124 A1* | 9/2012 | Goetz ................ | C09K 19/12 349/84 |
| 2014/0176856 A1* | 6/2014 | Lee .................. | G02F 1/133305 349/61 |
| 2014/0375939 A1* | 12/2014 | Zhong ................ | C09D 179/08 349/123 |
| 2015/0029455 A1 | 1/2015 | Kim et al. | |
| 2015/0098050 A1 | 4/2015 | Cho et al. | |

FOREIGN PATENT DOCUMENTS

| | | |
|---|---|---|
| KR | 10-2015-0079518 | 7/2015 |
| KR | 10-2017-0024630 | 3/2017 |

* cited by examiner

LIQUID CRYSTAL DISPLAY DEVICE AND METHOD FOR MANUFACTURING THE SAME

CROSS-REFERENCE TO RELATED APPLICATION

This application claims priority from and the benefit of Korean Patent Application No. 10-2015-0161761, filed on Nov. 18, 2015, which is hereby incorporated by reference for all purposes as if fully set forth herein.

BACKGROUND

Field

Exemplary embodiments relate to a liquid crystal display device and a method for manufacturing the liquid crystal display device.

Discussion of the Background

A liquid crystal display device is one of the currently most widely used flat panel display devices. Unfortunately, large liquid crystal display devices suffer from a narrow view angle range. This means that unless viewers are positioned directly in front of the center of the large liquid crystal display devices (i.e., at a 90 degree angle), the viewers have difficulty seeing images on the large liquid crystal display device or see the images with distortions. For example, a viewer positioned at a 40 degree angle or 140 degree angle from the center of the large flat liquid crystal display may not see or may not clearly see images displayed at the center portion or end portions (e.g., left, right, top, bottom ends) of the large flat liquid crystal display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display device having improved display quality. Exemplary embodiments further provide a method for manufacturing a liquid crystal display device having improved display quality.

Additional aspects will be set forth in the detailed description which follows, and, in part, will be apparent from the disclosure, or may be learned by practice of the inventive concept.

An exemplary embodiment includes a liquid crystal display device. The liquid crystal display device includes a first substrate, a first alignment film disposed on the first substrate, a second substrate, and a liquid crystal layer disposed between the first alignment film and the second substrate. The first substrate has a surface curved in a first direction and the second substrate has a surface curved in the first direction. The first alignment film includes a polymerization initiator and a polymer chain that is a copolymer of a dianhydride-based compound and a diamine-based compound. The polymer chain includes a main chain including a repeating unit including an imide group, a first side chain, including a vertical align group, bonded to the main chain, and a second side chain bonded to the main chain. The functional group includes a biphenyl group or a terphenyl group.

An exemplary embodiment also includes a method for manufacturing a liquid crystal display device. The method includes forming a first pre-alignment film on a first substrate, the pre-alignment film including a main alignment layer and a photocuring agent, forming a second alignment film on a second substrate, disposing a liquid crystal layer between the first pre-alignment film and the second alignment film, bonding the first substrate and the second substrate to each other, and irradiating light on the main alignment layer when an electric field is applied to the liquid crystal layer to form a first alignment film having photopolymers on the main alignment layer. A content of a polymerization initiator in the second alignment film may be at least one of zero and less than a content of a polymerization initiator in the first pre-alignment film. The first alignment film may include a polymer chain that may be a copolymer of a dianhydride-based compound and a diamine-based compound. The polymer chain may include a main chain that includes a repeating unit that includes an imide group. The polymer chain may also include a first side chain, including a vertical align group. The polymer chain may further include a second side chain, including a functional group that includes a biphenyl group or a terphenyl group, bonded to the main chain.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

Figure 1:
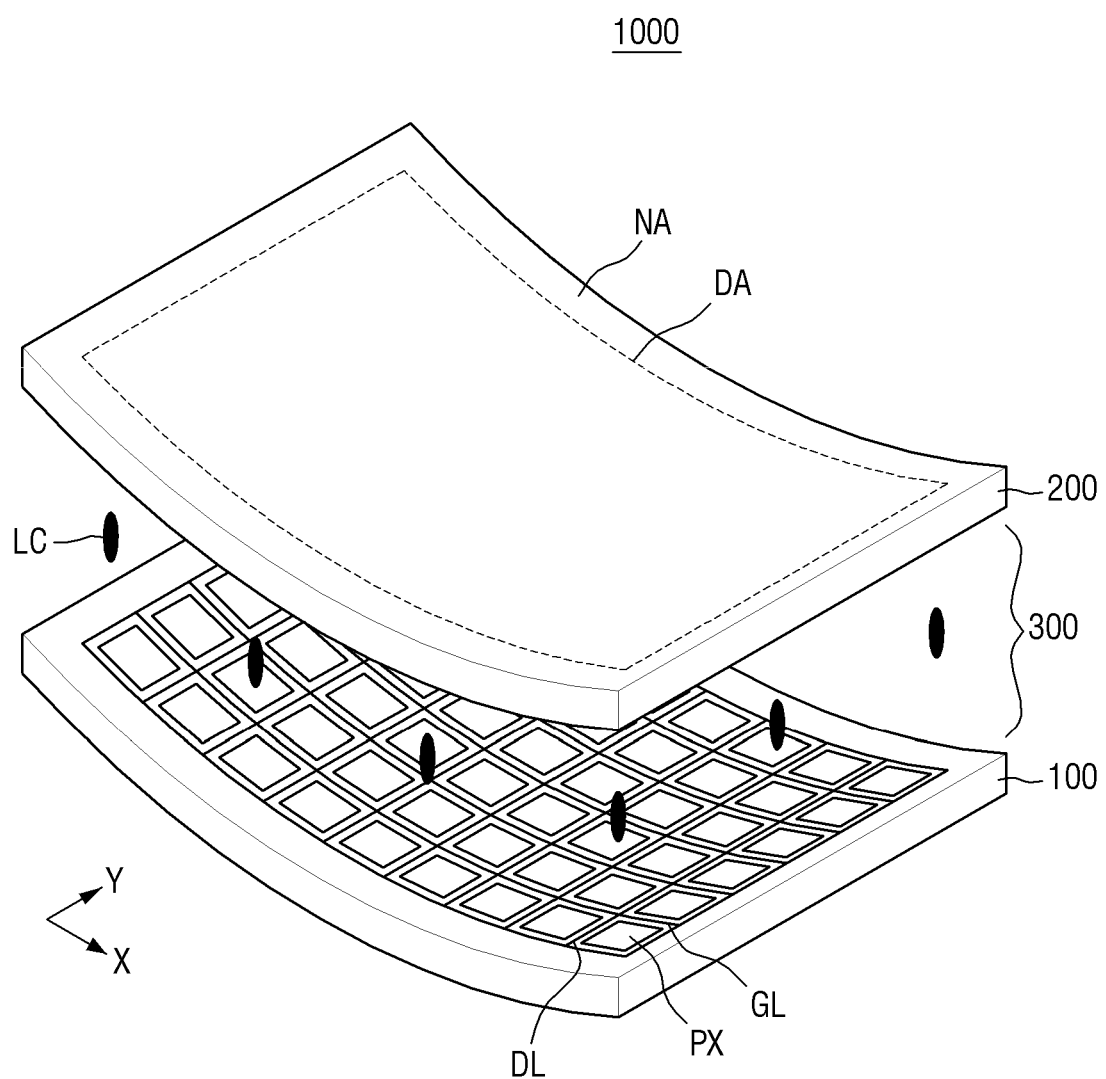
FIG. 1 is a schematic exploded perspective view of a liquid crystal display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," "including," "contains," and/or "containing," when used in this specification, specify the presence of stated features, integers, steps, operations, elements, components, and/or groups thereof, but do not preclude the presence or addition of one or more other features, integers, steps, operations, elements, components, and/or groups.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A liquid crystal display device may include two substrates having electric field generating electrodes such as pixel electrodes and a common electrode, and a liquid crystal layer interposed between the two substrates. The liquid crystal display device may apply voltages to the electric field generating electrodes to generate an electric field in the liquid crystal layer. The electric field applied to the liquid crystal layer may affect the alignment direction of liquid crystal molecules in the liquid crystal layer. The alignment direction of the liquid crystal molecules may affect the polarization of incident light. Thus, the application of the electric field may control polarization of incident light, thereby controlling the display of desired images.

A television receiver requires a large liquid crystal display device. With large liquid crystal display devices, a user's viewing angle is important and may affect whether a viewer can see or clearly see images on the center portion or end portions the large liquid crystal display device.

To compensate for a viewing angle difference, a liquid crystal display device is formed into a curved shape such as a concave shape. The curved liquid crystal display device having a portrait structure where its vertical length is longer than its horizontal length (i.e., width). The curved liquid crystal display device having a portrait structure is curved in a vertical direction. Similarly, the curved liquid crystal display device having a landscape structure where its vertical length is shorter than its horizontal length. The curved liquid crystal display device having a landscape structure is curved in a horizontal direction. The curved liquid crystal display device may increase a viewer's immersion experience, may enable a viewer to see distortion free images with uniform picture quality, and may enable a viewer to clearly see the display images at wider viewing angles due to more proportioned viewing angles.

However, curved liquid crystal display devices suffer from frequent misalignment between an upper substrate and a lower substrate than flat liquid crystal display devices. This misalignment causes dark vertical stripes in one or more pixels in the liquid crystal display device. These dark vertical stripes not only cause a luminance reduction of the liquid crystal display device but also create specks or after-images as well as a color imbalance that are visible to viewers. These problems become more severe as the curvature of the display panel increases.

Devices and methods of various exemplary embodiments overcome these problems. An exemplary embodiment includes liquid crystal molecules for a liquid crystal display device that improves light transmittance and minimizes a texture caused by a misalignment. An exemplary embodiment also includes an alignment film that reduces light exposure time and amount for providing pre-tilt to liquid crystal molecules and efficiently forming photopolymers at a surface of the alignment film when manufacturing a liquid crystal display device. An exemplary embodiment also includes a photo-curing agent having improved thermal stability in manufacturing that minimizes an undesired loss of the photo-curing agent caused by a thermal reaction. An exemplary embodiment further includes a photo-curing agent having improved light absorptivity that improves processability and prevents defects such as after-images or degradation in a voltage holding ratio caused by the photo-curing agent remaining in a liquid crystal layer. Therefore, various exemplary embodiments improve the viewing angle range of large liquid crystal displays without degrading image quality or caused by manufacturing difficulties such as misalignment between an upper substrate and a lower substrate of a liquid crystal display device.

FIG. 1 is a schematic exploded perspective view of a liquid crystal display device according to an exemplary embodiment.

Referring to FIG. 1, a liquid crystal display device 1000 may include a first substrate 100 having a first surface and a first alignment film (not shown) disposed on the first surface of the first substrate 100. The liquid crystal display device 1000 may also include a second substrate 200 having a first surface facing the first substrate 100 and a second surface from which light is emitted and a second alignment film (not shown) disposed on the first surface of the second substrate 200. The liquid crystal display device 1000 may further include a liquid crystal layer 300 interposed between the first substrate 100 and the second substrate 200. The first substrate 100 may be a lower display substrate and the second substrate 200 may be an upper display substrate. The second surface of the second substrate 200 may be a display surface through which a viewer may view an image.

Each of the first substrate 100 and the second substrate 200 may include a display area DA and a non-display area NA. The display area DA may display an image and the non-display area NA may not display an image. The non-display area NA may surround the display area DA.

The display area DA may include a plurality of gate lines GLs extending in a first direction (e.g., an X-direction direction), a plurality of data lines DLs extending in a second direction (e.g., a Y direction) intersecting the first direction, and a plurality of pixels PXs disposed in regions defined by the gate lines GLs and data lines DLs. The plurality of pixels PXs may be arranged in the first direction and the second direction. In other words, the plurality of pixels PXs may be arranged in a matrix.

Each of the pixel PXs may represent one primary color of a color display. For example, at least three pixels PXs of the plurality of pixels PXs correspond to the three primary colors of red, green, and blue.

The non-display area NA may be a light blocking area. A gate driving unit (not shown) for providing gate signals to the pixels PXs in the display area DA and a data driving unit (not shown) for providing data signals to the pixels PXs in the display area DA may be disposed in the non-display area NA. The gate lines GLs and the data lines DLs may extend from the display area DA to the non-display area NA and may electrically connect to each of the driving units.

The liquid crystal display device 1000 may further include a backlight unit (not shown). The backlight unit may be disposed below the first substrate 100 and may emit light from below the display panel including the first substrate 100 and the second substrate 200. The backlight unit may include a light source (not shown), a light guide plate (not shown) which enables light incident from the light source to be incident to the display panel, a reflection sheet (not shown) disposed below the light guide plate, and one or more optical sheets (not shown) disposed on the light guide plate so as to improve luminance characteristics of light advancing toward the display panel.

As shown in FIG. 1, the first substrate 100 and the second substrate 200 of the liquid crystal display device 1000 may be curved in the first direction X. The first surface of the first substrate 100 and/or the second surface (display surface) of the second substrate 200 may be concavely curved. However, exemplary embodiments are not limited to including a curved first surface of the first substrate 100 and/or a curved second surface of the second substrate 200. The first surface of the second substrate 200 and/or the first surface of the first substrate may be flat. Moreover, the first substrate 100 may include a second surface facing away from the second substrate 200 that is flat. Thus, the first substrate 100 and the second substrate 200 may have one or more surfaces that are either covered or flat. For example, the second surface of the first substrate 100 may be flat while the first surface of the first substrate 100 and the first and second surface of the second substrate 200 may be curved.

For convenience and brevity, but by no means limiting, the curved liquid crystal display device of various exemplary embodiments are illustrated and described as a flat panel liquid crystal display device in cross-sectionals views.

Figure 2:
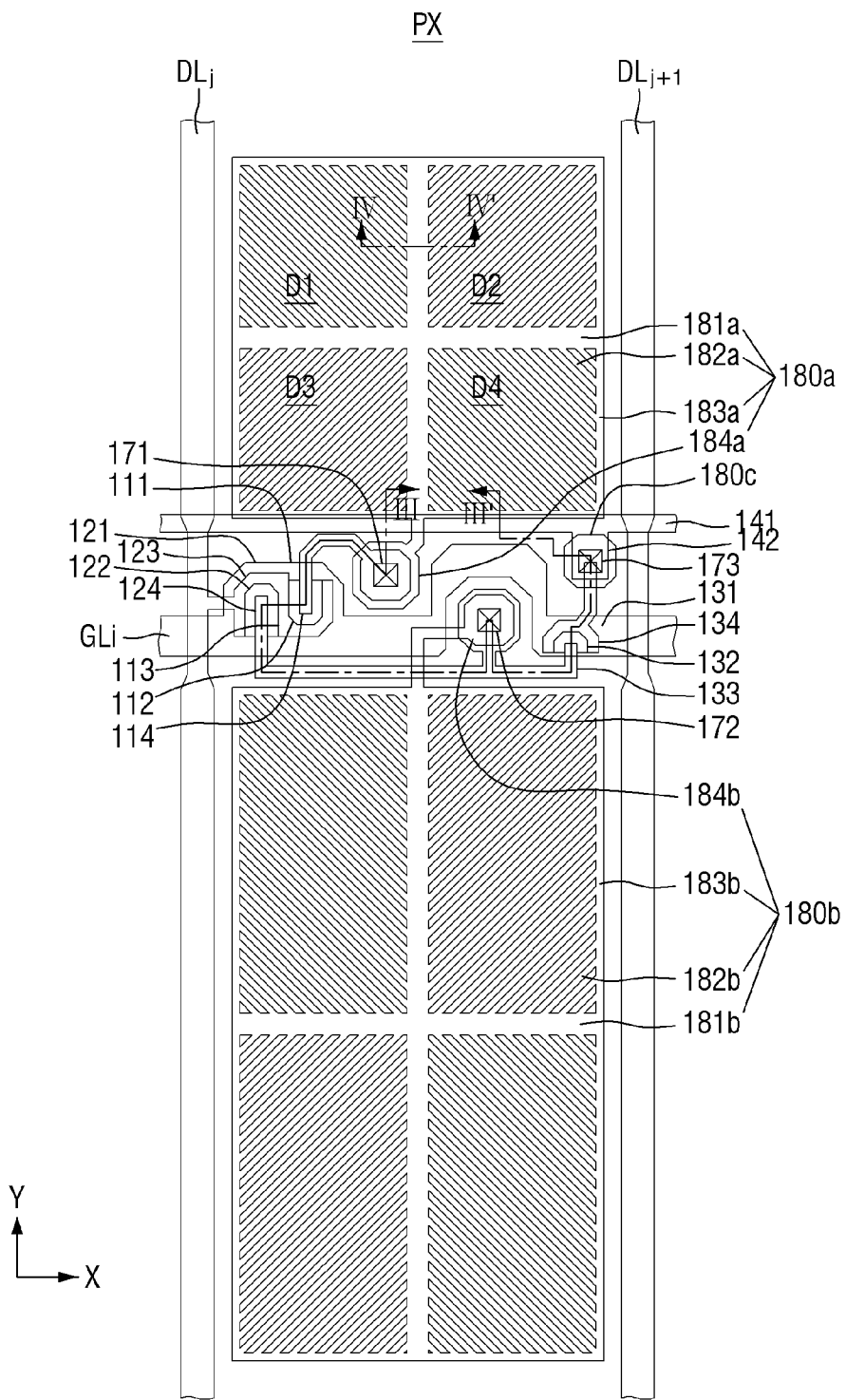
FIG. 2 is a schematic layout diagram illustrating one pixel of FIG. 1.
Figure 3:
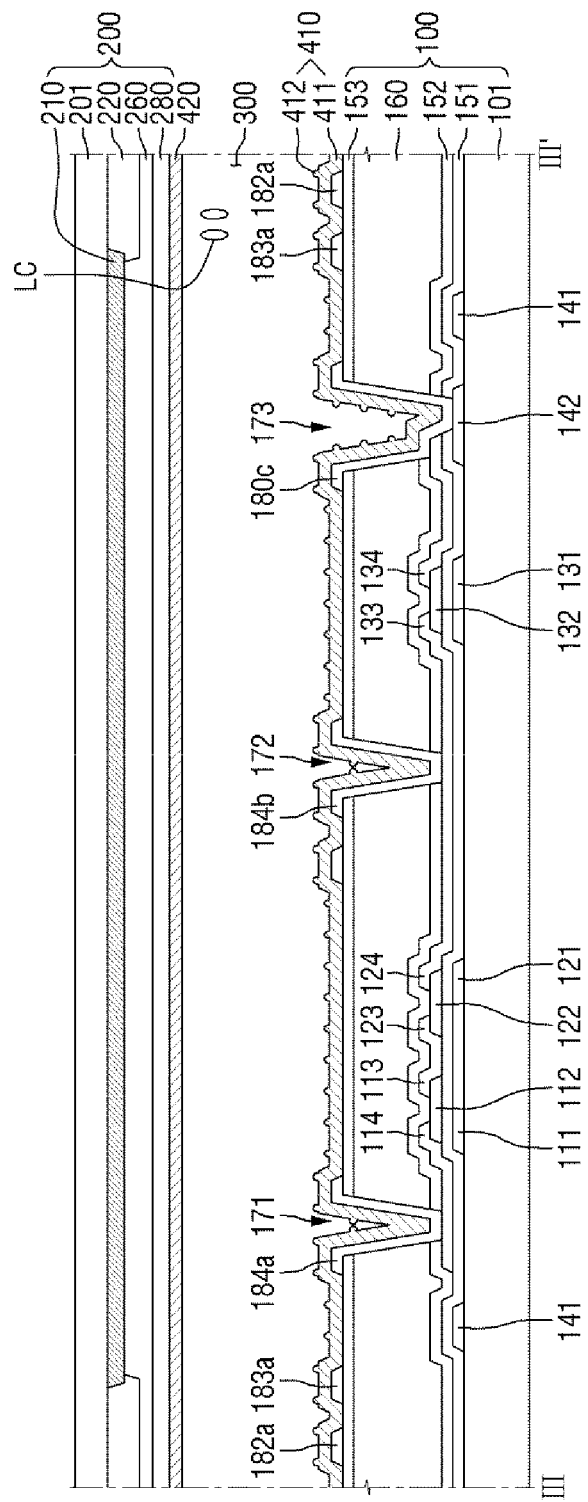
FIG. 3 is a cross-sectional view taken along sectional line III-III' of FIG. 2.
Figure 4:
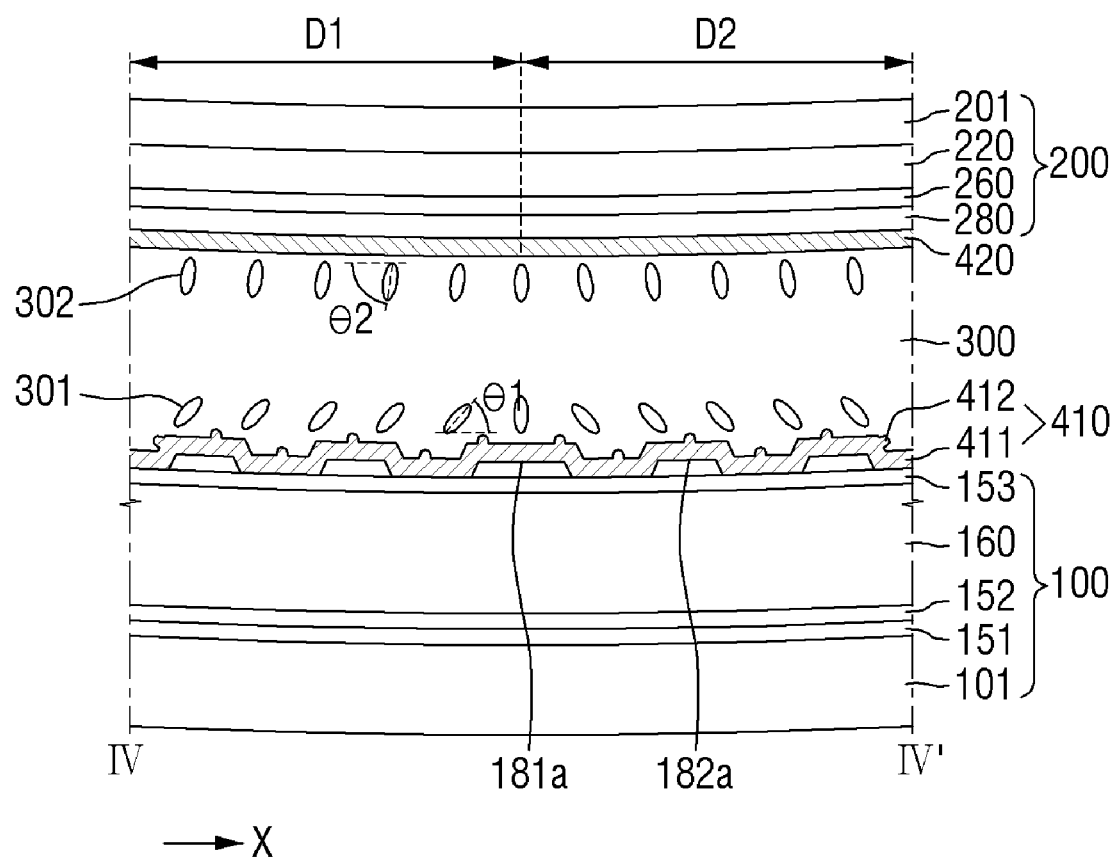
FIG. 4 is a cross-sectional view taken along sectional line IV-IV' of FIG. 2.

FIG. 2 is a schematic layout diagram illustrating one pixel of FIG. 1. FIG. 3 is a cross-sectional view taken along sectional line III-III' of FIG. 2. FIG. 4 is a cross-sectional view taken along sectional line IV-IV' of FIG. 2.

Referring to FIGS. 2-4, the first substrate 100 may include a first base substrate 101, a plurality of thin film transistors, a pixel electrode 180, a plurality of passivation layers, and a plurality of insulation layers.

The first base substrate 101 may be a transparent insulation substrate. The first base substrate 101 may include a material having excellent transmittance, heat resistance, and chemical resistance. For example, the first base substrate 101 may include at least one of silicon, glass, and plastic.

A gate wiring layer may be disposed on the first base substrate 101. The gate wiring layer may include a gate line GLi, a plurality of gate electrodes, and a reference voltage line 141.

The gate line GLi may extend substantially in the first direction. A first gate electrode 111 and a second gate electrode 121 may extend in the second direction which is substantially perpendicular from the extending direction of the gate line GLi. When referring to FIG. 2, the first gate electrode 111 and the second gate electrode 121 may extend upwards from the gate line GLi in the second direction. The first gate electrode 111 and the second gate electrode 121 may be formed integrally with each other without a physical boundary between the first gate electrode 111 and the second gate electrode 121. Referring to FIG. 2, the first gate electrode 111 may be positioned further to the right along the first direction than the second gate electrode 121. Furthermore, a third gate electrode 131 may be disposed in a region overlapped with the extended gate line GLi. That is, the first, second, and third gate electrodes 111, 121, and 131 may be connected to the same gate line GLi such that the same gate signal may be applied to the first, second, and third gate electrodes 111, 121, and 131.

The reference voltage line 141 may be formed in the same layer as the gate line GLi and the gate electrodes 111, 121, and 131. The reference voltage line 141 may extend substantially in parallel to the gate line GLi. A reference voltage may be applied to the reference voltage line 141.

The reference voltage line 141 may further include a reference voltage electrode 142. The reference voltage electrode 142 may extend substantially in the second direction which is substantially perpendicular from the extending direction of the reference voltage line 141. When referring to FIG. 2, the reference voltage electrode 142 may extend downwards from the reference voltage line 141. The reference voltage line 141 may have a wide surface to provide a space for a stable contact with a third drain electrode 134.

Unlike those shown in FIG. 2, the reference voltage line 141 may further include a voltage maintaining electrode and/or a voltage maintaining line in some exemplary embodiments. In this case, the voltage maintaining electrode may extend from the reference voltage line and cooperate with a data wiring layer overlapped with the voltage maintaining electrode. A plurality of passivation layers, and/or a plurality of insulation layers may be interposed between the voltage maintaining electrode and the data wiring layer so as to constitute a storage capacitor. Furthermore, the voltage maintaining line may extend from the reference voltage line 141 and may be disposed along an edge of the pixel electrode such that the voltage maintaining line is overlapped with at least a portion of a rim part of the pixel electrode. However, exemplary embodiments are not so limited. The voltage maintaining electrode and/or the voltage maintaining line may be omitted. Alternatively, the shape and arrangement of the voltage maintaining electrode and/or the voltage maintaining line may be modified.

The gate wiring line may be obtained by forming a first metal layer including at least one element or alloy comprising at least one element of tantalum (Ta), tungsten (W), titanium (Ti), molybdenum (Mo), aluminum (Al), copper (Cu), silver (Ag), chrome (Cr), and neodymium (Ne). The first metal layer may be patterned. The patterning process may be performed by using a mask other processes patterning process.

A gate insulation layer 151 may be disposed on the gate wiring layer over the entire surface of the first base substrate 101. The gate insulation layer 151 may be made of an insulating material and may insulate elements formed on from elements beneath the gate insulation layer 151. The gate insulation layer 151 may include at least one of silicon nitride ($SiN_X$), silicon oxide ($SiO_X$), silicon nitride oxide ($SiN_XO_Y$) and silicon oxynitride ($SiO_XN_Y$), where X is independently greater than or equal to one (i.e., X≥1) and Y is independently greater than or equal to one (i.e., Y≥1). The gate insulation layer 151 may include a multi-layer structure including two insulation layers having different physical properties.

A semiconductor material layer may be disposed on the gate insulation layer 151. The semiconductor material layer may include a first semiconductor layer 112, a second semiconductor layer 122, and a third semiconductor layer 132. The first semiconductor layer 112, the second semiconductor layer 122, and the third semiconductor layer 132 may completely overlap or partially overlap the first gate electrode 111, the second gate electrode 121, and the third gate electrode 131, respectively. The semiconductor material layer may include a semiconductor material. For example, the semiconductor material layer may include at least one of amorphous silicon, polycrystalline silicon, and an oxide semiconductor. The first, second, and third semiconductor layers 112, 122, and 132 may serve as a channel of a thin film transistor, and may be turned on or off depending on the voltage supplied to the corresponding gate electrode 111, 121, and 131.

A data wiring layer may be disposed on the semiconductor material layer. The data wiring layer may include data lines DLj and DLj+1, a plurality of source electrodes, and a plurality of drain electrodes.

The data line DLj may extend substantially in the second direction to intersect the gate line GLi. A data signal may be applied to the data line DLj. Intersecting data lines DLj and the gate lines GLi may define the pixel PX. The plurality of pixels PXs may operate independently from each other by thin film transistors connected by corresponding gate lines GLi and data lines DLj.

The first source electrode 113 and the first drain electrode 114 may be disposed on the first gate electrode 111 and the first semiconductor layer 112 such that first source electrode 113 and the first drain electrode 114 are spaced apart from each other. Similarly, the second source electrode 123 and the second drain electrode 124 may be disposed on the second gate electrode 121 and the second semiconductor layer 122 such that the second source electrode 123 and the second drain electrode 124 are spaced apart from each other. Also similarly, the third source electrode 133 and the third drain electrode 134 may be disposed on the third gate electrode 131 and the third semiconductor layer 132 such that the third source electrode 133 and the third drain electrode 134 are spaced apart from each other. As shown in FIG. 2, the first source electrode 113 may partially enclose a portion of the first drain electrode 114. Similarly, the second source electrode 123 may partially enclose a portion of the second drain electrode 124. Also similarly, the third drain electrode 134 may partially enclose a portion of the third source electrode 133. However, exemplary embodiments are not limited to what is illustrated in FIG. 2. For example, each of the first and second source electrodes 113 and 123 and the third drain electrode 134 may have a C, U, inverse C or inverse U shape. The first and second source electrodes 113 and 123 may be formed integrally with each other without a physical boundary between the first and second source electrodes 113 and 123. The first and second source electrodes 113 and 123 may extend away from the data line DLj in a substantially perpendicular direction from the direction the data line DLj extends. The third source electrode 133 may be physically connected to the second drain electrode 124. The first drain electrode 114 may be electrically connected to a first subpixel electrode 180*a* through a first contact hole 171, the second drain electrode 124 may be electrically connected to a second subpixel electrode 180*b* through a second contact hole 172, and the third drain electrode 134 may be electrically connected to the reference voltage electrode 142 through a third contact hole 173 and a contact electrode 180*c*.

The data wiring layer may be obtained by forming a second metal layer including refractory metal. For example, the data wiring layer may include at least one element, an alloy comprising at least one element, and/or a metal nitride comprising at least one element of silver (Ag), gold (Au), copper (Cu), nickel (Ni), platinum (Pt), palladium (Pd), iridium (Ir), rhodium (Rh), tungsten (W), aluminum (Al), tantalum (Ta), molybdenum (Mo), cadmium (Cd), zinc (Zn), iron (Fe), titanium (Ti), silicon (Si), germanium (Ge), zirconium (Zr), and barium (Ba). The second metal layer may be patterned.

Although not shown in the drawings, an ohmic contact layer may be interposed between the semiconductor material layer and the data wiring layer. The ohmic contact layer may include a hydrated amorphous silicon material that is highly doped with n-type impurities. Alternatively or in addition, the ohmic contact layer may include a silicide.

Insulation layers including a first passivation layer 152, a planarizing layer 160, and a second passivation layer 153 may be disposed on the data wiring layer over the entire surface of the first base substrate 101. The insulation layers may be formed of an organic layer and/or an inorganic layer. In an exemplary embodiment, each of the passivation layers and the planarizing layers has a multi-layer structure.

The first passivation layer 152 may include an inorganic insulation material. For example, the first passivation layer 152 may include at least one of silicon nitride ($SiN_x$) and silicon oxide ($SiO_x$), where X is independently greater than or equal to one (i.e., X≥1). The first passivation layer 152 may prevent the wirings (e.g., the connection between the second drain electrode 124 and the third source electrode 133) and electrodes (e.g., the first, second, and third source electrodes 113, 123, and 133 and the first, second, and third drain electrodes 114, 124, and 134) disposed below the first passivation layer 152 from directly contacting an organic material from the planarizing layer 160 disposed above the first passivation layer 152. The planarizing layer 160 including an organic material may be disposed on the first passivation layer 152. The planarizing layer 160 may enable a plurality of components stacked on the first base substrate 101 to have a uniform height. The second passivation layer 153 may be disposed on the planarizing layer 160. The second passivation layer 153 may prevent the liquid crystal layer 300 from being contaminated by an organic material discharged from the planarizing layer 160, thereby preventing defects such as the display of an after-image of the liquid crystal display device 1000.

A contact hole may be formed in the insulation layers including the first passivation layer 152, the planarizing layer 160, and the second passivation layer 153 to expose a portion of the first, second, and third drain electrodes 114, 124, and 134 as well as the reference voltage electrode 142. The first contact hole 171 may be formed to expose a portion of the first drain electrode 114, the second contact hole 172 may be formed to expose a portion of the second drain electrode 124, and the third contact hole 173 may be formed to expose a portion of the third drain electrode 134 and a portion of the reference voltage electrode 142.

The pixel electrode and the contact electrode 180c may be disposed on the second passivation layer 153. The contact electrode 180c may be disposed within the third contact hole 173 to contact the reference voltage electrode 142 and the third drain electrode 134 to enable the electrical connection of the reference voltage electrode 142 and the third drain electrode 134. The contact electrode 180c may be made of a material similar to or the same as of the material of the pixel electrode. An integrated process may form both the contact electrode 180c and the pixel electrode.

The pixel electrodes may be disposed to correspond to the respective pixels PXs. The pixel electrodes may cooperate with a common electrode 280 on the second substrate 200 to generate a vertical electric field and control the alignment direction of the liquid crystal molecules LCs in the liquid crystal layer 300 interposed between the first substrate 100 and the second substrate 200. The pixel electrodes may be transparent electrodes. For example, the transparent electrodes may include at least one of indium tin oxide (ITO) and indium zinc oxide (IZO). However, exemplary embodiments are not limited to transparent electrodes. The pixel electrodes may include the first subpixel electrode 180a and the second subpixel electrode 180b spaced apart from each other in the second direction.

The first subpixel electrode 180a may have a roughly quadrangular shape and may be a pattern electrode having split domains. Specifically, the first subpixel electrode 180a may include a first center electrode 181a, a plurality of first branched finger electrodes 182a extending from the first center electrode 181a, a first rim electrode 183a provided at a rim portion of the first subpixel electrode 180a to interconnect the plurality of first branched finger electrodes 182a, and a first protruded electrode 184a protruding from the first rim electrode 183a.

The first center electrode 181a may be formed approximately into a cross shape. The first branched finger electrodes 182a may radially extend in an oblique direction from the cross-shaped first center electrode 181a. For example, the branched finger electrodes 182a may extend at an approximately 45° angle with respect to the first center electrode 181a. Thus, the first subpixel electrode 180a may have four domains divided by the first center electrode 181a. Throughout the detailed description, the domains are referred to as first domain D1, second domain D2, third domain D3, and fourth domain D4 in a clockwise direction starting from a left upper domain. The first branched finger electrodes 182a of the various domains may extend in different directions and or the same direction. As an example, domains D1 and D2 as well as domains D3 and D2 extend have first branched finger electrodes 182a that extend in the same directions, but domains D1 and D3 as well as D2 and D4 have first branched finger electrodes 182a that extend in different directions. The domains D1 to D4 may function as a director of liquid crystal molecules LCs to enable the liquid crystal molecules LCs to be tilted in different directions during an operation of the liquid crystal display device 1000. Thus, liquid crystal alignment may be more precisely controlled by the use of the domains. Moreover, if the liquid crystal alignment is more precisely controlled in a liquid crystal display device, the liquid crystal display device achieves a larger viewing angle, reduction in the occurrence of an after-image or texture, and an increase in the transmittance and response speed.

Portions of the radially extending first branched finger electrodes 182a may be interconnected through the first rim electrode 183a to portions of other radially extending first branched finger electrodes 182a. For example, an end of one radially extending first branch finger electrode 182a and an end of another radially extending first branch electrode 182a may be connected the first rim electrode 183a. Furthermore, the first protruded electrode 184a having a wide area may be disposed in a lower portion of the first subpixel electrode 180a to stably contact the first drain electrode 114 through the first contact hole 171. In this case, a data voltage supplied from the data line DLj may be applied to the first subpixel electrode 180a through the drain electrode 114.

The second subpixel electrode 180b may include a second center electrode 181b, a plurality of second branched finger electrodes 182b extending from the second center electrode 181b, a second rim electrode 183b provided at a rim part of the second subpixel electrode 180b to interconnect the plurality of second branched finger electrodes 182b, and a second protruded electrode 184b protruding from the second rim electrode 183b. The second subpixel electrode 180b may have a shape and an arrangement roughly the same as the first subpixel electrode 180a. However, the second subpixel electrode 180b may have a rectangular shape having a length in the second direction longer than a length in the first direction. In a plane, the second subpixel electrode 180b may have an area larger than that of the first subpixel electrode 180a. For example, an area ratio of the first subpixel electrode 180a and the second subpixel electrode 180b in a plane may be approximately 1:2 to 1:10.

The second protruded electrode 184b may have a wide area and may be disposed in an upper portion of the second subpixel electrode 180b to stably contact the second drain electrode 124 through the second contact hole 172. In this case, a voltage, having an absolute value of amplitude between that of the data voltage supplied from the data line DLj and the reference voltage supplied from the reference voltage line 141, may be applied to the second subpixel electrode 180b.

In one pixel PX, an electric field may be generated in the liquid crystal layer overlapped with the first subpixel electrode 180a (referred to as the "first liquid crystal capacitor"), by a difference between the data voltage and the common voltage such that the first liquid crystal capacitor may be charged with a voltage relatively larger than that of a second liquid crystal capacitor, described later, to control the alignment of liquid crystals. In the same pixel PX, an electric field may be generated in the liquid crystal layer overlapped with the second subpixel electrode 180b (referred to as the "second liquid crystal capacitor"), by a difference between the voltage less than the data voltage and the common voltage such that the second liquid crystal capacitor may be charged with a voltage relatively less than that of the first liquid crystal capacitor, to control the alignment of the liquid crystals.

The first liquid crystal capacitor charged with a relatively higher voltage may provide a poor side visibility in a low grey level where liquid crystals are vertically aligned. The second liquid crystal capacitor charged with a relatively lower voltage may provide a poor side visibility in an intermediate grey level and a high grey level where liquid crystals are close to a vertical alignment. In other words, the voltages charged in the first and second liquid crystal capacitors may represent gamma curves different from each other. The gamma curve for one pixel voltage perceived by a viewer may be a combination of the two gamma curves. Image data may be converted such that a front synthesis gamma curve may conform to a front reference gamma curve determined to become most suitable and a side synthesis gamma curve may become closest to the front reference gamma curve, thereby further improving side visibility.

However, exemplary embodiments of the pixel electrodes are not limited to the arrangement described above. For example, the pixel electrodes may be arranged into a bent shape with respect to the gate line and the data line, may be modified into various shapes of branched finger electrodes, and/or only one pixel electrode formed into a single body may be disposed in one pixel representing one color.

A first alignment film 410 may be disposed on the entire surface of the first substrate 100 including the first base substrate 101, the plurality of thin film transistors, the pixel electrode, the plurality of passivation layers, and the plurality of insulation layers.

The first alignment film 410 may include a main alignment layer 411. The main alignment layer 411 may include a polymer chain that is a copolymer of a dianhydride-based compound and a diamine-based compound. The main alignment layer 411 may include at least one of a polyamic acid having a main chain with a repeating unit containing an imide group (—CONRCO—), a polymer obtained by partially imidizing polyamic acid having a repeating unit containing an imide group, and a polyimide obtained by cyclodehydrating polyamic acid having a repeating unit containing an imide group.

In an exemplary embodiment, the main alignment layer 411 includes a polymer chain having a repeating unit containing the structure expressed by the following Chemical Formula IA or Chemical Formula IB.

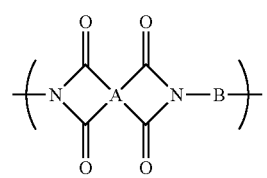

(Chemical Formula IA)

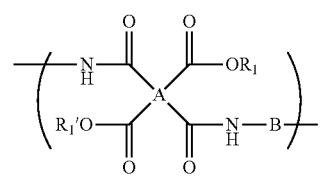

(Chemical Formula IB)

In Chemical Formula IA and Chemical Formula IB above, A may be a tetravalent organic group derived from cycloaliphatic dianhydride or aromatic dianhydride, and B may be a divalent organic group derived from cycloaliphatic diamine or aromatic diamine. In Chemical Formula IB, each of $R_1$ and $R_1'$ may independently be a hydrogen, a substituted or unsubstituted alkyl, or a substituted or unsubstituted aryl.

For example, the tetravalent organic group derived from a cycloaliphatic dianhydride may be a substituted or unsubstituted cycloaliphatic organic group having 4 to 16 carbon atoms, the tetravalent organic group derived from an aromatic dianhydride may be a substituted or unsubstituted aromatic organic group having 6 to 14 carbon atoms, the divalent organic group derived from a cycloaliphatic diamine may be a substituted or unsubstituted cycloaliphatic organic group having 4 to 16 carbon atoms, and the divalent organic group derived from an aromatic diamine may be a substituted or unsubstituted aromatic organic group having 6 to 14 carbon atoms However, exemplary embodiments are not limited to the tetravalent organic groups or the divalent organic groups listed in this paragraph. The inventors envision using any suitable tetravalent organic groups or the divalent organic group.

As another example, the tetravalent organic group derived from cycloaliphatic dianhydride or the tetravalent organic group derived from aromatic dianhydride may be any one among

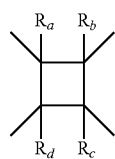

(wherein, each of $R_a$ to $R_d$ may independently be a hydrogen, a halogen or an alkyl group),

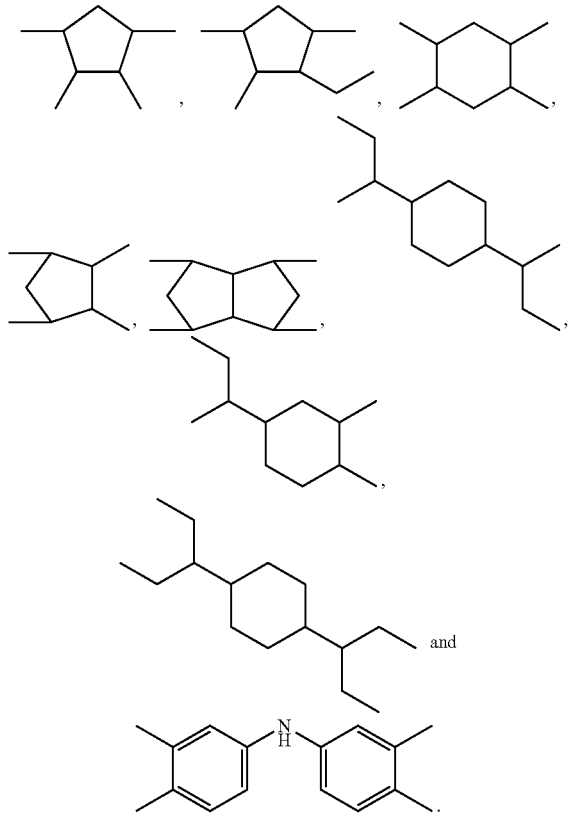

As another example, the divalent organic group derived from cycloaliphatic diamine or the divalent organic group derived from aromatic diamine may be any one among

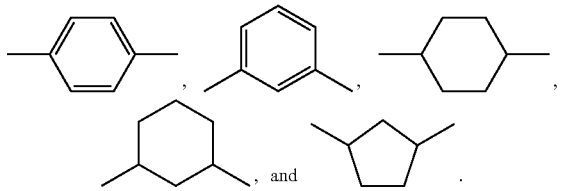

However, the tetravalent organic groups or the divalent organic groups are not limited to those listed in this paragraph. The inventors envision that any suitable tetravalent organic group or divalent organic group may be used.

Furthermore, the main alignment layer 411 may be a vertically alignment layer including a material having a main chain with a repeating unit containing a polymer chain and a side chain. A vertical align group may be introduced to the side chain. The vertical align group may be at least one of an alkyl group, a hydrocarbon derivative having a terminal substituted with an alkyl group, a hydrocarbon derivative having a terminal substituted with a cycloalkyl group, and a hydrocarbon derivative having a terminal substituted with aromatic hydrocarbon. The liquid crystal molecules LCs in the liquid crystal layer 300 may be vertically aligned by the vertical align group introduced to the side chain of the polymer chain in the main alignment layer 411 of the first alignment film 410.

In an exemplary embodiment, the main alignment layer 411 includes a polymer chain having a repeating unit containing the structure expressed by Chemical Formula IIA or Chemical Formula IIB.

(Chemical Formula IIA)

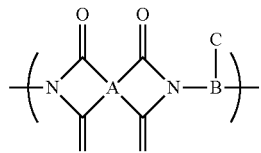

(Chemical Formula IIB)

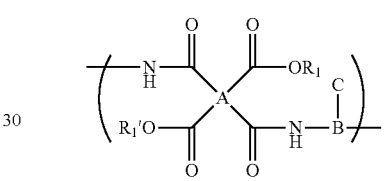

In Chemical Formula IIA and Chemical Formula IIB above, A may be a tetravalent organic group derived from a cycloaliphatic dianhydride or an aromatic dianhydride, B may be a trivalent organic group derived from a cycloaliphatic diamine or an aromatic diamine, and C may be a vertical align group side chain. In Chemical Formula IIB, each of $R_1$ and $R_1'$ may independently be a hydrogen, a substituted or unsubstituted alkyl, or a substituted or unsubstituted aryl.

For example, the trivalent organic group derived from cycloaliphatic diamine may be any one among

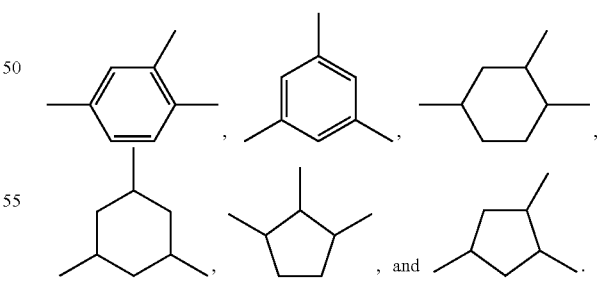

However, the tetravalent organic groups or the divalent organic groups are not limited to those listed in this paragraph. The inventors envision that any suitable tetravalent organic group or divalent organic group may be used In an exemplary embodiment, the vertical align group (C) is a functional group expressed by Chemical Formula IIC or Chemical Formula IID.

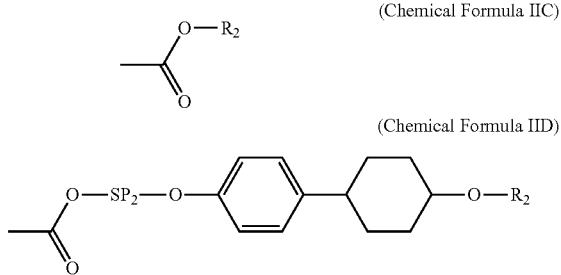

(Chemical Formula IIC)

(Chemical Formula IID)

In Chemical Formula IIC and Chemical Formula IID above, $R_2$ may be an alkyl group having 3 to 25 carbon atoms. Chemical Formula IID, $SP_2$ may be a single bond between adjacent oxygen elements or an alkyl group having 1 to 5 carbon atoms.

Furthermore, at least a portion of the side chain of the polymer chain in the main alignment layer 411 may further include an auxiliary light absorbing group introduced as well as the vertical align group. The auxiliary light absorbing group may be a functional group including a biphenyl group or a terphenyl group. In this case, the auxiliary light absorbing group may exhibit high light absorption properties in particular wavelength range such as the ultraviolet wavelength range. For example, the auxiliary light absorbing group may absorb light having a wavelength of 350 to 380 nanometers (nm). As another example, the auxiliary light absorbing group may absorb light in a narrower wavelength range of 355 to 370 nm. Thus, the auxiliary light absorbing group of the main alignment layer 411 may facilitate a polymerization reaction by a polymerization initiator contained in the main alignment layer 411 when the auxiliary light absorbing group absorbs ultraviolet light. As the content of the auxiliary light absorbing group in the main alignment layer 411 becomes higher, more photopolymers 412 may be formed, which will be discussed later.

In an exemplary embodiment, the main alignment layer 411 includes a polymer chain having a repeating unit containing the structure expressed by the Chemical Formula IIIA or Chemical Formula IIIB.

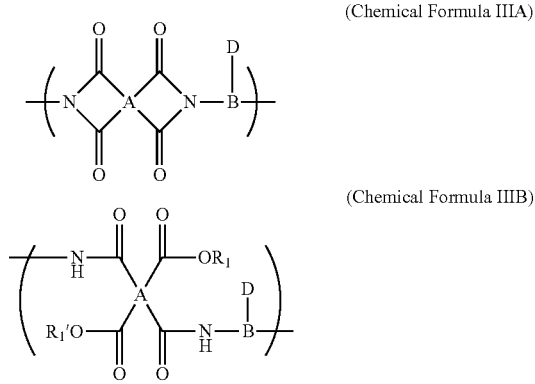

(Chemical Formula IIIA)

(Chemical Formula IIIB)

In Chemical Formula IIIA and Chemical formula IIIB above, A may be a tetravalent organic group derived from a cycloaliphatic dianhydride or an aromatic dianhydride, B may be a trivalent organic group derived from a cycloaliphatic diamine or an aromatic diamine, and D may be a functional group side chain containing a biphenyl group or a terphenyl group. In Chemical Formula IIIB, each of $R_1$ and $R_1'$ may independently be a hydrogen, a substituted or unsubstituted alkyl, or a substituted or unsubstituted aryl.

In an exemplary embodiment, the functional group (D) containing the biphenyl group or terphenyl group is a functional group expressed by the Chemical formula IIIC or chemical formula IIID.

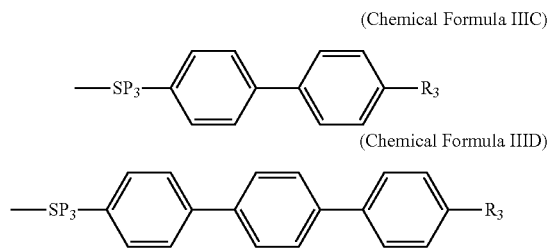

(Chemical Formula IIIC)

(Chemical Formula IIID)

In Chemical Formula IIIC and Chemical Formula IIID, $R_3$ may be an alkyl or aryl having 2 to 10 carbon atoms, and $SP_3$ may be an ether group or an ester group.

Furthermore, at least a portion of the side chain of the polymer chain in the main alignment layer 411 may further include a side chain having a polymerization initiator in addition to the vertical align group and the auxiliary light absorbing group. The polymerization initiator may absorb ultraviolet rays, decompose into radicals, and initiate a polymerization reaction. Much like the auxiliary light absorbing group, as the concentration of the polymerization initiator becomes higher, more photopolymers may be formed, which will be discussed later. In an exemplary embodiment, the polymerization initiator exists in the form of additive compounds added to the main alignment layer 411.

For example, the polymerization initiator may include at least one of acetophenone, benzoin, benzophenone, diethoxy acetophenone, phenyletone, thioxanthone, 2-hydroxy-2-methyl-1-phenylpropane-1-on, benzyl-dimethyl-tar, 4-(2-hydroxy ethoxy)phenyl-(2-hydroxy)-2-propyl ketone, 1-hydroxycyclohexyl phenyl ketone, o-benzoyl benzoic acid methyl, 4-phenyl benzophenone, 4-benzoyl-4'-methyl-diphenyl sulfides, (4-benzoyl benzyl) trimethyl ammonium chlorides, bis(2,4,6-trimethyl benzoyl)-phenyl phosphine oxide, diphenyl(2,4,6-trimethyl benzoyl)-phosphine oxide, 2-hydroxy methyl propion nitrile, 2,2'-asobis(2-methyl-N-[1,1'-bis(hydroxymethyl)-2-hydroxyethyl) propion amide], acrylic acid [(2-methoxy-2-phenyl-2-benzoyl)-ethyl] ester, phenyl 2-acryloyloxy-2-propyl ketone, phenyl 2-methacryloyloxy-2-propyl ketone, 4-isopropylphenyl 2-acryloyloxy-2-propyl ketone, 4-chlorophenyl 2-acryloyloxy-2-propyl ketone, 4-dodecyl phenyl 2-acryloyloxy-2-propyl ketone, 4-methoxyphenyl 2-acryloyloxy-2-propyl ketone, 4-acryloyloxy phenyl 2-hydroxy-2-propyl ketone, 4-methacryloyloxy phenyl 2-hydroxy-2-propyl ketone, 4-(2-acryloyloxy ethoxy)-phenyl 2-hydroxy-2-propyl ketone, 4-(2-acryloyloxy diethoxy)-phenyl 2-hydroxy-2-propyl ketone, 4-(2-acryloyloxy ethoxy)-benzoin, 4-(2-acryloyloxy ethylthio)-phenyl 2-hydroxy-2-propyl ketone, 4-N,N'-bis-(2-acryloyloxy ethyl)-aminophenyl 2-hydroxy-2-propyl ketone, 4-acryloyloxy phenyl 2-acryloyloxy-2-propyl ketone, 4-methacryloyloxy phenyl 2-methacryloyloxy-2-propyl ketone, 4-(2-acryloyloxy ethoxy)-phenyl 2-acryloyloxy-2-propyl ketone, 4-(2-acryloyloxy diethoxy)-phenyl 2-acryloyloxy-2-propyl ketone, dibenzylketone, benzoin alkyl ether, benzoin methyl ether, benzoin ethyl ether, benzoin isopropyl ether, benzoin isobutyl ether, dialkyl acetophenone, hydroxyl alkylketone, phenyl glyoxylate, benzyl dimethyl ketal, acylphosphine, and α-aminoketone. However, exemplary embodiments are not limited to the polymerization initiators listed in this paragraph.

The first alignment film 410 may further include the photopolymers 412 chemically bonded to the side chain of the polymer chain in the main alignment layer 411. The photopolymers 412 may include a polymeric compound in which single molecules of a photocuring agent are bonded to the vertical align group side chain and/or the polymerization initiator side chain in the main alignment layer 411. The single molecules of the photocuring agent may be polymerized with each other. The polymeric compound being formed into a shape of micro protuberances on the surface of the main alignment layer 411. That is, the first alignment film 410 may include the main alignment layer 411 and the photopolymers 412 chemically bonded to the side chain of the main alignment layer 411. The photopolymers 412 may be formed into micro protuberances disposed on portions of the surface of the main alignment layer 411. For example, the photocuring agent may be reactive mesogen (RM) and the photopolymers 412 may be polymers of reactive mesogen.

The reactive mesogen may be a compound that includes a mesogen core structure having a mesogen group (rigid group) for expressing liquid crystal properties. The reactive mesogen may have a polymerizable terminal group (reactive group) for polymerization. Thus, the reactive mesogen may include crosslinkable low molecules and/or macromolecules and may cause chemical reactions such as a polymerization reaction upon absorption of light of a specific wavelength and/or heat.

For instance, the rigid group may be a substituted or unsubstituted cyclohexyl, a substituted or unsubstituted biphenyl, a substituted or unsubstituted terphenyl, or a substituted or unsubstituted naphthalene. The polymerizable terminal group be methacrylate, acrylate, vinyl, vinyloxy, or epoxy. However, exemplary embodiments are not limited to the rigid groups or polymerizable terminal groups listed above. For example, the rigid group may be one among

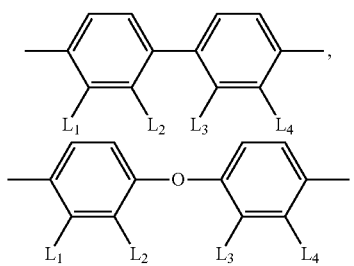

(wherein, each of $L_1$ to $L_4$ may independently be a hydrogen or a halogen, and either $L_1$ or $L_2$ may be a hydrogen, and either $L_3$ or $L_4$ may be a hydrogen),

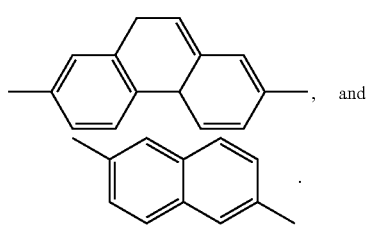, and

Also as an example, the polymerizable terminal group may be one among

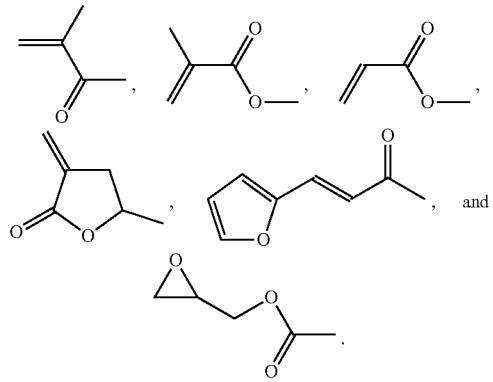, and

Furthermore, the reactive mesogen may have a rod type, banana type, board type, and/or disk type structure.

The photocuring agent may further include an auxiliary light absorbing group in addition to the rigid group in the mesogen core structure. The auxiliary light absorbing group may be a biphenyl group or a terphenyl group. The mesogen core structure, including the rigid group and the auxiliary light absorbing group, may maintain its chemical structure even after a polymerization reaction. Thus, the first alignment film 410 may include a side chain containing a biphenyl group or a terphenyl group that is formed by polymerizing a polymerization initiator side chain and the reactive mesogen.

In an exemplary embodiment, the photocuring agent includes the structure expressed by Chemical Formula IVA or Chemical Formula IVB.

(Chemical Formula IVA)

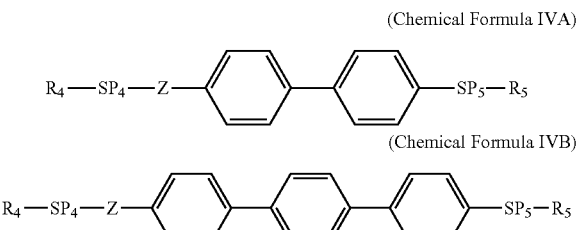

(Chemical Formula IVB)

Where, in Chemical Formula IVA and Chemical Formula IVB above, each of $R_4$ and $R_5$ may independently be a methacrylate group, an acrylate group, a vinyl group, a vinyloxy group, or an epoxy group, each of $SP_4$ and $SP_5$ may independently be a single bond between $R_4$ and Z, an alkyl group having 1 to 12 carbon atoms or an alkoxy group having 1 to 12 carbon atoms, and Z may be a rigid group containing a cycloaliphatic or an aromatic hydrocarbon having 6 to 18 carbon atoms.

When a photocuring agent includes a biphenyl group or a terphenyl group as an auxiliary light absorbing group, a mesogen core structure may have a fully elongated length. The photocuring agent may include an additional bond to achieve improved thermal stability high absorption to light having a main wavelength. In other words, the photocuring agent may be capable of inducing photopolymerization and a polymerization reaction. Thus, the wavelength of light used in the photopolymerization step and the wavelength of light to which the photocuring agent exhibits the highest absorption efficiency may be matched (conjugated) with each other to reduce exposure time and irradiation amount. This improves processability and reduces the time required for photopolymerization, thereby preventing degradation in voltage holding ratio caused by damage in liquid crystal molecules. Furthermore, this process and components means an unacted photocuring agent remaining in a liquid crystal layer may be effectively removed, thereby preventing defects such as the appearance of an after-image.

The photopolymers 412 may be cured with a predetermined slope and maintain the slope after curing. The photopolymers 412 may provide liquid crystal molecules with a pre-tilt alignment by an interaction force between the photopolymers 412 and adjacent liquid crystal molecules. Alternatively or in addition, the photopolymers 412 may provide liquid crystal molecules with a pre-tilt alignment by a physical force.

In an exemplary embodiment, at least a portion of the side chain of the polymer chain in the main alignment layer 411 further includes a side chain substituted with an ion scavenger in addition to the vertical align group, the auxiliary light absorbing group, the polymerization initiator, and the side chain of the photopolymers 412. The ion scavenger may be a cation scavenger or an anion scavenger. The ion scavenger may scavenge ion impurities in the liquid crystal layer 300 to improve the voltage holding ratio of the liquid crystal display device 1000.

The second substrate 200 may include a second base substrate 201, a light blocking member 210, a color filter 220, an overcoat layer 260, and a common electrode 280.

The second base substrate 201 may be a transparent insulation substrate similar to the first base substrate 101. The light blocking member 210 may be disposed on the second base substrate 201. The light blocking member 210 may be a black matrix. The light blocking member 210 may be disposed in a boundary region between the plurality of pixels PXs. For example, the light blocking member 210 may be disposed in a region overlapped with the data lines DLj and DLj+1 and in a region overlapped with the gate line GLi. The light blocking member 210 may prevent defects such as undesired color mixture or light leakage which might occur in the boundary between the plurality of pixels PXs.

The color filter 220 may be disposed on the light blocking member 210 such that the color filter 220 may overlap the pixel PX. The color filter 220 may selectively transmit light in a specific wavelength range. The color filter 220 may be interposed between the two neighboring data lines DLj and DLj+1. Color filters 220 which transmit light in different wavelength ranges may be disposed in the respective pixels PXs adjacent each other. For example, a red color filter may be disposed in a first pixel, and a green color filter may be disposed in a second pixel adjacent to the first pixel.

Although the light blocking member 210 and the color filter 220 are depicted as being disposed on the second substrate 200 in FIG. 3, one or more of the light blocking member and the color filter are disposed on the first substrate 100 an exemplary embodiment.

The overcoat layer 260 including an organic material may be disposed on the light blocking member 210 and the color filter 220 over the entire surface of the second base substrate 201. The overcoat layer 260 may prevent the light blocking member 210 from escaping from the second base substrate 201. The overcoat layer 260 may also suppress after-images caused by the particles of a pigment discharged from the color filter 220. The overcoat layer 260 may further enable components stacked on the second base substrate 201 to have a uniform height. In an exemplary embodiment, the overcoat layer 260 is omitted.

The common electrode 280 may be disposed on the overcoat layer 260. The common electrode 280 may be a transparent electrode similar to the pixel electrodes 180a and 180b. The common electrode 280 may overlap each of the plurality of pixels PXs except for a small portion of the plurality of pixels PXs.

A second alignment film 420 may be disposed on the entire surface of the second substrate 200. The second alignment film 420 may be a vertical alignment film including a polymer chain that is a copolymer of a dianhydride-based compound and a diamine-based compound. The polymer chain may include at least one of a polyamic acid having a main chain with a repeating unit containing an imide group, a polymer obtained by partially imidizing polyamic acid having a repeating unit containing an imide group, and a polyimide obtained by cyclodehydrating polyamic acid having a repeating unit containing an imide group The polymer chain may have a side chain to which a vertical align group is introduced. The vertical align group be at least one of an alkyl group, a hydrocarbon derivatives having a terminal substituted with an alkyl group, a hydrocarbon derivative having a terminal substituted with a cycloalkyl group, and a hydrocarbon derivative having a terminal substituted with aromatic hydrocarbon. The liquid crystal molecules LCs in the liquid crystal layer 300 may be vertically aligned by the vertical align group in the second alignment film 420.

In an exemplary embodiment, the second alignment film 420 includes a polymer chain having a repeating unit containing the structure expressed by the Chemical Formula IA or Chemical formula IB.

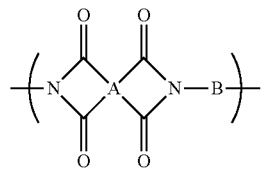

(Chemical Formula IA)

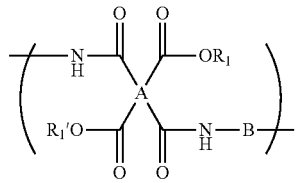

(Chemical Formula IB)

In Chemical Formula IA and Chemical Formula IB above, A is a tetravalent organic group derived from cycloaliphatic dianhydride or an aromatic dianhydride, and B is a divalent organic group derived from a cycloaliphatic diamine or an aromatic diamine. In Chemical Formula IB, each of $R_1$ and $R_1'$ may independently be a hydrogen, a substituted or unsubstituted alkyl, or a substituted or unsubstituted aryl.

In an exemplary embodiment, the second alignment film 420 includes a polymer chain having a repeating unit containing the structure expressed by Chemical Formula IIA or Chemical Formula IIB.

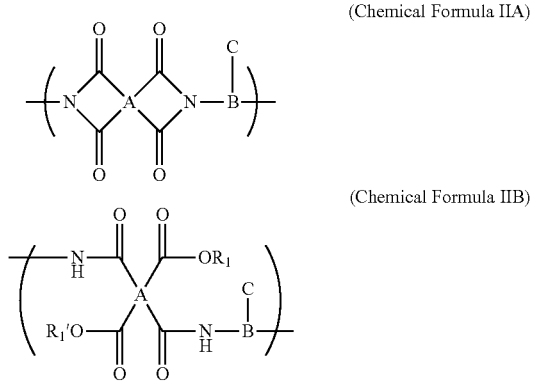

(Chemical Formula IIA)

(Chemical Formula IIB)

In Chemical Formula IIA and Chemical Formula IIB above, A is a tetravalent organic group derived from a cycloaliphatic dianhydride or an aromatic dianhydride, B is a trivalent organic group derived from a cycloaliphatic diamine or an aromatic diamine, and C is a vertical align group side chain. In Chemical Formula IIB, each of $R_1$ and $R_1'$ may independently be a hydrogen, a substituted or unsubstituted alkyl, or a substituted or unsubstituted aryl.

The vertical align group has been described above with reference to the first alignment film 410, and thus detailed description of the vertical align group in the second alignment film 420 will be omitted for brevity.

The second alignment film 420 differs from the main alignment layer 411 of the first alignment film 410 in that the polymer chain in the second alignment film 420 does not include a side chain having an auxiliary light absorbing group introduced to the side chain or does not include a substantial amount of the auxiliary light absorbing group introduced to the side chain. The second alignment film 210 does not include a side chain having a polymerization initiator and a side chain chemically bonded to the photopolymers 412 or does not include a side chain having a substantial amount of a polymerization initiator and a side chain chemically bonded to the photopolymers 412. As described above, the content of a polymerization initiator and an auxiliary light absorbing group in an alignment film may affect the degree of the polymerization of photopolymers. That is, the second alignment film 420 does not include an auxiliary light absorbing group and a polymerization initiator. Thus, photopolymers may not be formed in the second alignment film 420 or an extremely small amount of photopolymers may be formed in the second alignment film 420 when compared with the first alignment film 410. In this case, the first alignment film 410 may have a surface roughness greater than that of the second alignment film 420 due to the photopolymers 412 on the surface of the first alignment film 410. This may be because the degree of the polymerization of the photopolymers 412, the size of the photopolymers 412, the length of the photopolymers 412, and the content of the photopolymers 412 per unit area formed on the first alignment film 410 are larger than those of the photopolymers formed on the surface of the second alignment film 420.

In an exemplary embodiment, the second alignment film 420 includes an extremely low content of an auxiliary light absorbing group and/or an extremely low content of a polymerization initiator when compared with the main alignment layer 411 of the first alignment film 410.

The liquid crystal layer 300 may include a plurality of liquid crystal molecules. The liquid crystal layer 300 may include first liquid crystal molecules 301 adjacent to a surface of the first alignment film 410 and second liquid crystal molecules 302 adjacent to a surface of the second alignment film 420. The first liquid crystal molecules 301 aligned by the first alignment film 410 may have a pre-tilt angle in an initial alignment state due to the cured photopolymers 412 having a certain slope. The liquid crystal molecules may tilt in the pre-tilt direction when electric fields are generated in the liquid crystal layer 300, thereby improving response speed of the liquid crystal display device 1000. Throughout the description, the initial alignment state may mean the state where no electric field is generated between the first substrate and the second substrate or the state where the same voltage or substantially the same voltage is applied to the first substrate and the second substrate. Also throughout the description, the pre-tilt angle may mean an acute angle defined by a major axis of liquid crystal molecules with respect to a surface of the first substrate or the second substrate. For example, if liquid crystal molecules are completely vertically aligned with respect to the surface of the first substrate or the second substrate, the liquid crystal molecules may have a pre-tilt angle 90°.

In particular, the first liquid crystal molecules 301 adjacent to the first alignment film 410 may be aligned approximately with a first pre-tilt angle (θ1), and the second liquid crystal molecules 302 adjacent to the second alignment film 420 may be aligned approximately with a second pre-tilt angle (θ2) greater than the first pre-tilt angle (θ1). That is, the second liquid crystal molecules 302 adjacent to the second substrate 200 may have an aligned direction closer to vertical than the first liquid crystal molecules 301 adjacent to the first substrate 100. For example, the second pre-tilt angle (θ2) may be approximately 1° or more than the first pre-tilt angle (θ1).

This may be because, while the first alignment film 410 includes the photopolymers 412, the second alignment film 420 may not have photopolymers existing on the surface the surface of the second alignment film 420. Or even if photopolymers exist on the surface of the second alignment film 420, the degree of polymerization, the size/length of photopolymers, and/or the content of photopolymers per unit area may be extremely small when compared with those of the photopolymers 412 on the surface of the first alignment film 410.

In an initial state, a predetermined pre-tilt may be formed in the first liquid crystal molecules 301, and a larger pre-tilt or substantially vertically alignment may be formed in the second liquid crystal molecules 302, thereby reducing, or eliminating specks or darkness caused by a collision between alignment directions of the first and second liquid crystal molecules 301 and 302.

Meanwhile, liquid crystal molecules in the first domain D1 and liquid crystal molecules in the second domain D2 may have different pre-tilt directions. For example, liquid crystal molecules in the first domain D1 may be aligned by being tilted in a right downward direction in the plane view of FIG. 2 (right side of the cross-sectional view of FIG. 4), while liquid crystal molecules in the second domain D2 may be aligned by being tilted at the same degree with the corresponding liquid crystal molecules in the first domain D1 but being tilted in the different direction, that is, in a left downward direction in the plane view of FIG. 2 (left side of the cross-sectional view of FIG. 4). As described above, domains having different aligned directions may provide improved viewing angle and response speed.

Figure 5:
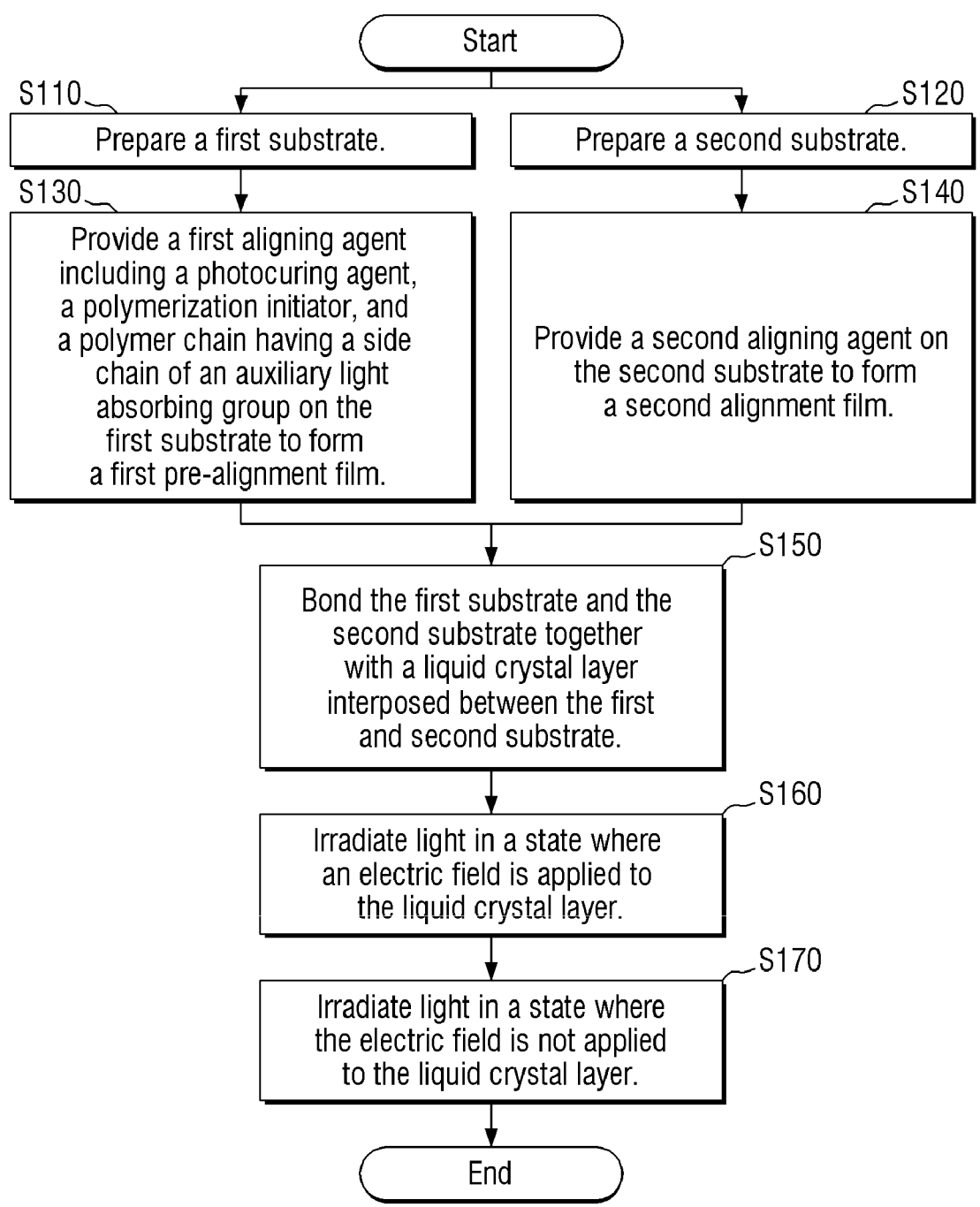
FIG. 5 is a flowchart illustrating process steps for manufacturing a liquid crystal display device according to an exemplary embodiment.

FIG. 5 is a flowchart illustrating process steps for manufacturing a liquid crystal display device according to an exemplary embodiment. FIG. 6, FIG. 7, FIG. 8, FIG. 9, FIG. 10, and FIG. 11 are cross-sectional views illustrating process steps of FIG. 5.

Figure 6:
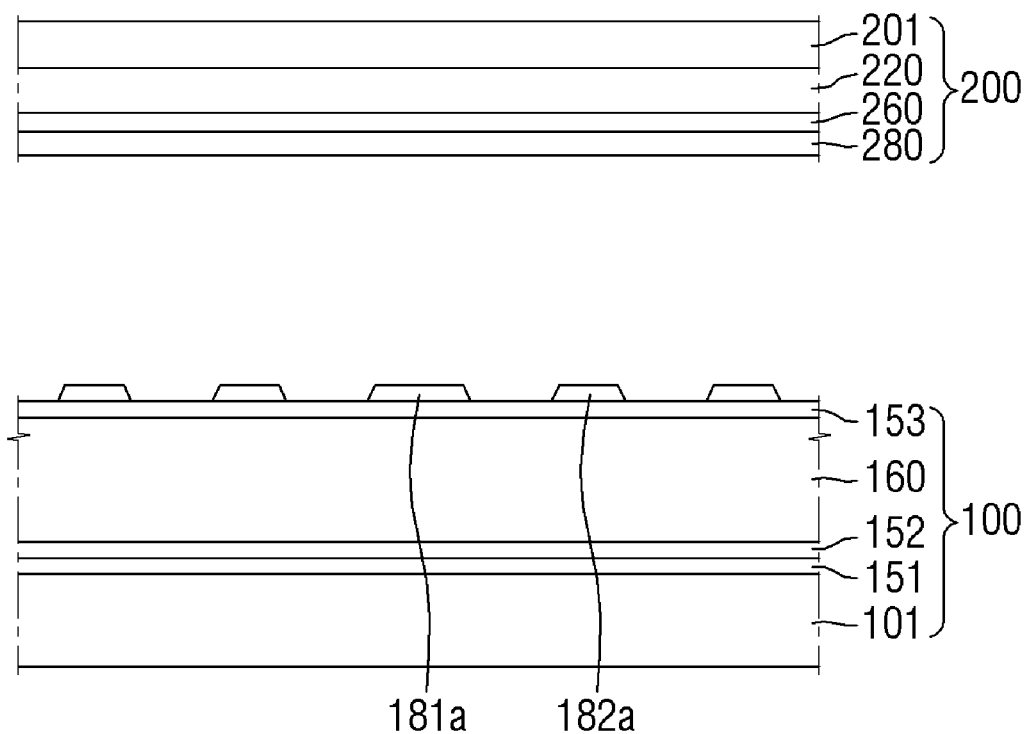
FIG. 6, FIG. 7, FIG. 8, FIG. 9, FIG. 10, and FIG. 11 through are cross-sectional views illustrating process steps of FIG. 5.

Referring to FIGS. 5 and 6, a gate wiring layer (not shown), the gate insulation layer 151, a data wiring layer (not shown), first and second passivation layers 152 and 153, the planarizing layer 160 and pixel electrodes may be disposed on the first base substrate 101 to prepare the first substrate 100 (S110). Further, a light blocking member (not shown), the color filter 220, the overcoat layer 260, and the common electrode 280 may be disposed on the second base substrate 201 to prepare the second substrate 200 (S120). The first substrate 100 may be a lower display substrate and the second substrate 200 may be an upper display substrate. Structures and components of the first and second substrates 100 and 200 have been described with reference to FIGS. 2, 3, and 4, and thus overlapping descriptions of the first and second substrates 100 and 200 will be omitted for brevity.

Figure 7:
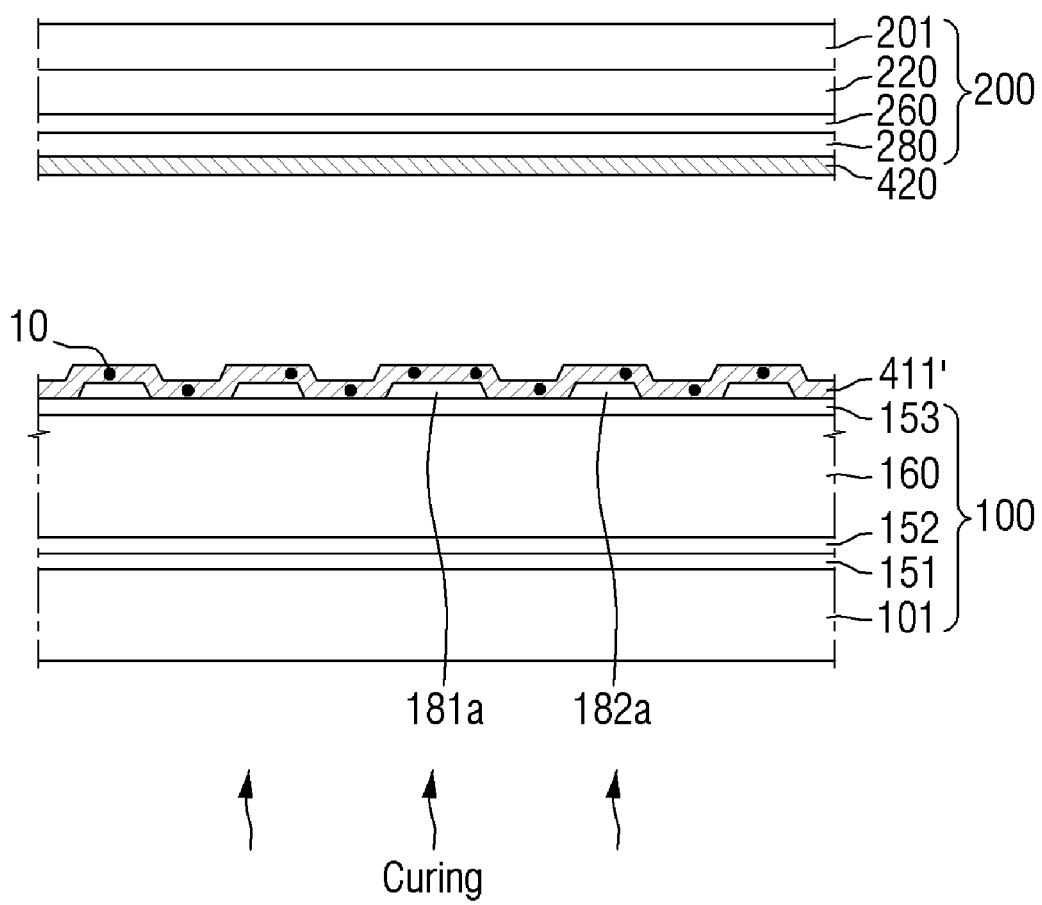

Referring to FIGS. 5 and 7, a first aligning agent may be provided on the first substrate 100 to form a first pre-alignment film 411' (S130). Specifically, the first aligning agent may include a polymerization initiator, the photocuring agent 10, and a predetermined amount of a solvent, and a polymer chain that is a copolymer of a dianhydride-based compound and a diamine-based compound. The first aligning agent may be provided by a spin coating process and/or a slit coating process. However, exemplary embodiments are not limited to a spin coating process and a slit coating process. Any suitable process may be used.

The first aligning agent may not include a photocuring agent. The photocuring agent may be provided together with a liquid crystal composition.

The polymer chain of the first aligning agent may include a polyamic acid having a main chain with a repeating unit containing at least one of an imide group, a polymer obtained by partially imidizing polyamic acid having a repeating unit containing an imide group, and a polyimide obtained by cyclodehydrating polyamic acid having a repeating unit containing an imide group.

In an exemplary embodiment, the polymer chain of the first aligning agent has a repeating unit containing the structure expressed by Chemical Formula IA or Chemical Formula IB described above.

The polymer chain of the first aligning agent may include a side chain to which a vertical align group is introduced. The vertical align group being at least one among an alkyl group, hydrocarbon derivatives having a terminal substituted with an alkyl group, a hydrocarbon derivatives having a terminal substituted with a cycloalkyl group, and a hydrocarbon derivative having a terminal substituted with an aromatic hydrocarbon.

In an exemplary embodiment, the polymer chain of the first aligning agent has a repeating unit containing the structure expressed by Chemical Formula IIA or Chemical Formula IIB described above.

The vertical align group of the polymer chain may be a functional group expressed by Chemical Formula IIC or Chemical Formula IID described above.

The polymer chain of the first aligning agent may further include a side chain having an auxiliary light absorbing group introduced to the side chain. The auxiliary light absorbing group may be a functional group including a biphenyl group or a terphenyl group.

In an exemplary embodiment, the polymer chain of the first aligning agent has a repeating unit containing the structure expressed by Chemical Formula IIIA or Chemical Formula IIIB described above.

The functional group including the biphenyl group or terphenyl group may be a functional group expressed by Chemical Formula IIIC or Chemical Formula IIID described above.

The polymer chain of the first aligning agent may further include a side chain having a polymerization initiator introduced to the side chain. In an exemplary embodiment, the polymerization initiator exists in the form of an additive compound added to the first aligning agent. The polymerization initiator has been described with reference to FIGS. 2, 3, and 4, and thus the overlapping description of the polymerization initiator will be omitted for brevity.

After providing the first aligning agent, the first aligning agent may be cured to form a first pre-alignment film. The step of curing the first aligning agent may include one or more heat treating processes. In an exemplary embodiment, the step of curing the first aligning agent includes a primary curing step and a secondary curing step. The primary curing step may be a pre-curing step and the secondary curing step may be a main curing step or a post-curing step. The primary curing step and the secondary curing step may be sequentially performed, but in an exemplary embodiment, the primary curing step and the secondary curing step may be continuously performed in same chamber or substantially in the same chamber. In other words, the primary curing step and the secondary curing step may be overlapping process steps rather than two distinct steps.

The primary curing step may remove the solvent contained in the first aligning agent or induce a layer separation. For example, the curing temperature may be approximately 50 to 100° C., or approximately 60 to 75° C., in the primary curing step. Furthermore, the primary curing step may be performed for approximately 60 to 300 seconds or for approximately 70 to 120 seconds.

The secondary curing step may substantially complete the polymerization of the polymer chain contained in the first aligning agent. The secondary curing step may be performed at a higher temperature and for a longer time period than the primary curing step. For example, the curing temperature may be approximately 150 to 270° C., or approximately 170 to 230° C., in the secondary curing step. Furthermore, the secondary curing step may be performed for approximately 500 to 1500 seconds, or for approximately 700 to 1300 seconds.

"Curing temperature" above, broadly refers to the temperature of the chamber responsible for curing the first aligning agent rather than the actual temperature of the first aligning agent. However, a particular curing temperature may correspond to the actual temperature of the first aligning agent during the primary or secondary curing steps.

A second aligning agent is provided on the second substrate 200 to form the second alignment film 420 (S140). The second aligning agent may include a predetermined solvent and a polymer chain having a main chain with a repeating unit containing an imide group and a side chain that is at least partially substituted with a vertical align group.

In an exemplary embodiment, the polymer chain of the second aligning agent has a repeating unit containing the structure expressed by Chemical Formula IA or Chemical Formula IB described above.

In another exemplary embodiment, the polymer chain of the second aligning agent may have a repeating unit containing the structure expressed by the Chemical Formula IIA or Chemical Formula IIB described above.

The second aligning agent differs from the first aligning agent in that the second aligning agent does not include or does not include a substantial amount of a polymerization initiator, a side chain substituted with a polymerization initiator, and the photocuring agent 10. Except for that, the composition of the second aligning agent may be substantially the same as that of the first aligning agent. For example, the second aligning agent is identical with the first aligning agent in that the second aligning agent includes a polymer chain having a main chain with a repeating unit containing therein an imide group and a side chain at least partially substituted with a vertical align group. Curing of the second aligning agent to form the second alignment film 420 may be performed in a similar manner as curing of the first aligning agent to form the first pre-alignment film 411', and thus the overlapping description of curing the second aligning agent will be omitted for brevity.

Figure 8:
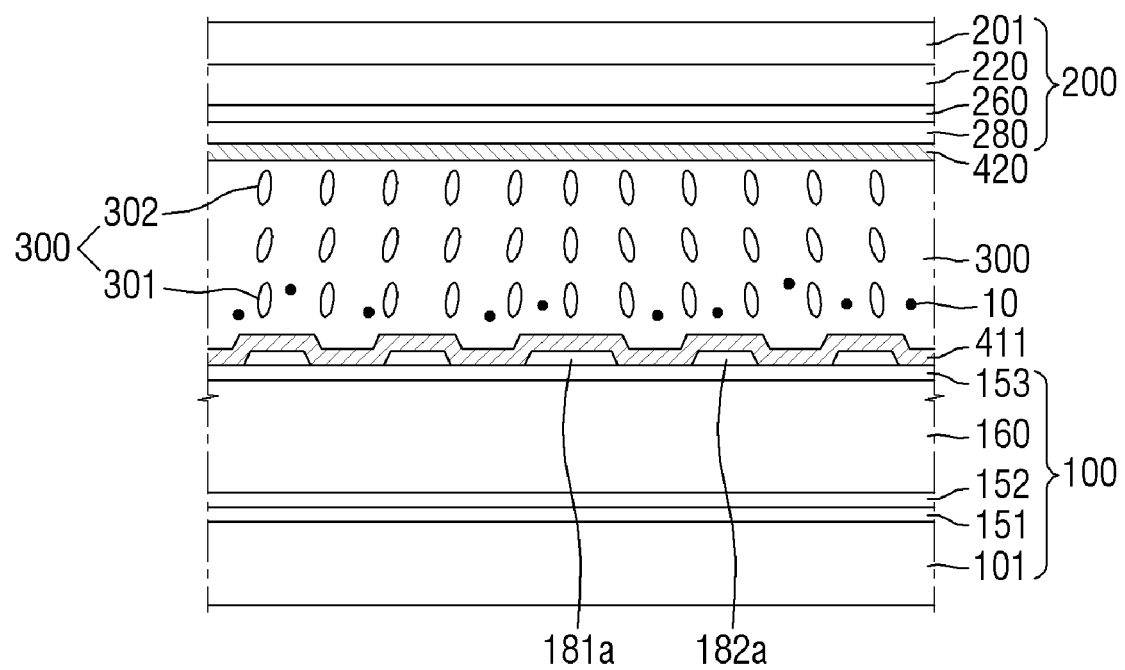

Referring now to FIGS. 5 and 8, the first substrate 100 and the second substrate 200 may be bonded to each other with the liquid crystal layer 300 interposed between the first substrate 100 and the second substrate 200 (S150). In an exemplary embodiment, the liquid crystal layer is interposed by dispensing a liquid crystal composition on the first substrate 100 and/or the second substrate 200 followed by bonding the two substrates to each other. Alternatively the liquid crystal layer may be interposed by bonding the first substrate 100 and the second substrate 200 to each other followed by injecting a liquid crystal composition.

In an exemplary embodiment, the first pre-alignment film 411' (see FIG. 7) includes both the main alignment layer 411 and the photocuring agent 10. Some or all of the photocuring agent 10 contained in the first pre-alignment film 411' may be discharged into the liquid crystal layer 300 and located near the first substrate 100 (see FIG. 8). Thus, the photocuring agent 10 is contained in the liquid crystal composition. After the photocuring agent 10 is discharged in to the liquid crystal layer 300, the reminder of pre-alignment film 411' is considered the main alignment layer 411.

The liquid crystal molecules in the liquid crystal layer 300 may include the first liquid crystal molecules 301 adjacent to a surface of the main alignment layer 411 and the second liquid crystal molecules 302 adjacent to a surface of the second alignment film 420. In an initial aligned state (i.e., where no electric field is generated or applied), the first liquid crystal molecules 301 and the second liquid crystal molecules 302 may be vertically aligned or substantially aligned in the vertical direction by the respective vertical align groups in the main alignment layer 411 and the second alignment film 420.

Although not shown in the drawings, in an exemplary embodiment, a heat treating process may be performed after the formation of a liquid crystal layer to improve dispersability and uniformity of liquid crystal molecules and to promote discharge of the photocuring agent 10 contained in the first pre-alignment film 411' shown in FIG. 7 to the liquid crystal layer 300. The heat treating process may be an annealing process.

Figure 9:
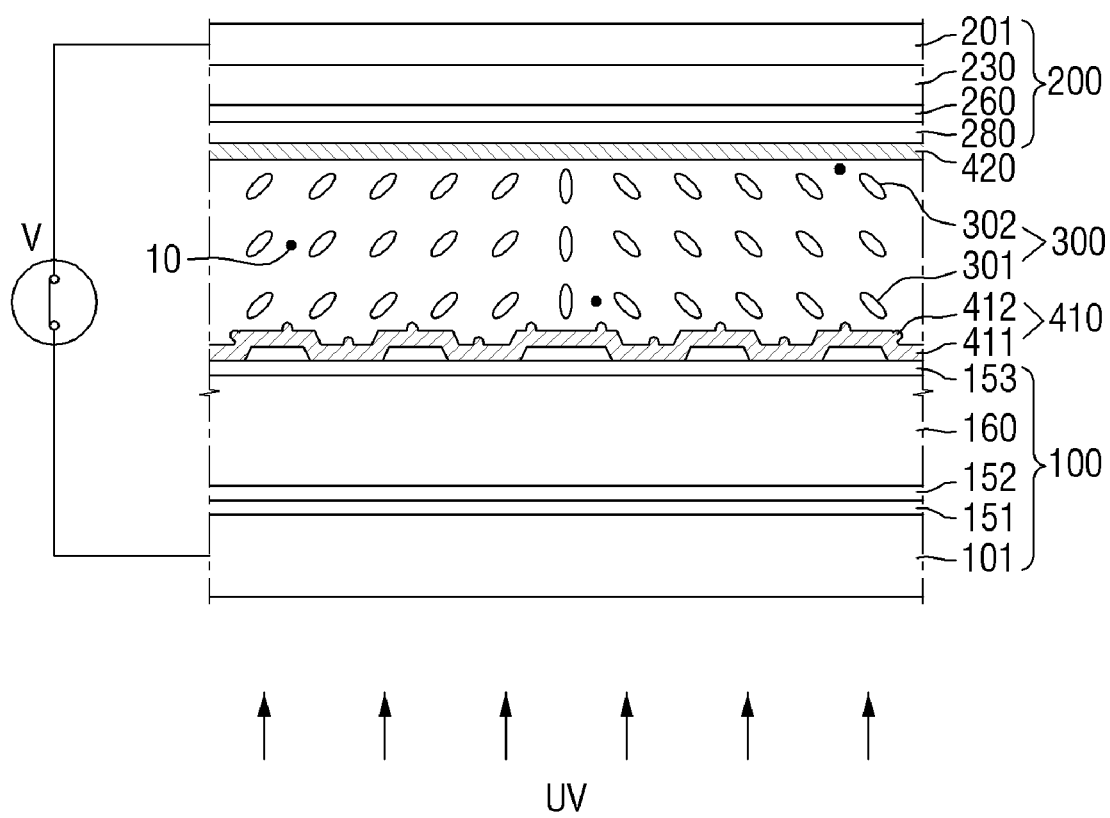

Referring to FIGS. 5 and 9, light may be irradiated in a state where an electric field is applied to the liquid crystal layer 300 (S160). When a vertical electric field is generated between the first substrate 100 and the second substrate 200, the major axis of the liquid crystal molecules in the liquid crystal layer 300 may tilt in the direction vertical to the electric field. Furthermore, as the liquid crystal molecules tilt, the vertical align groups in the main alignment layer 411 and the second alignment film 420 may also tilt with a slope similar to those of the first and second liquid crystal molecules 301 and 302.

In an exemplary embodiment, the light is an ultraviolet ray having a wavelength of approximately 300 to 380 nm, a wavelength of approximately 350 to 380 nm, or a wavelength of approximately 355 to 370 nm. Furthermore, the light may be irradiated with an exposure amount of approximately 0.1 to 15 J/cm$^2$ or an exposure amount of approximately 1 to 4 J/cm$^2$ or less.

The polymer chain in the main alignment layer 411 may have a side chain with an auxiliary light absorbing group introduced to the side chain. The introduction of the auxiliary light absorbing group may lead to high absorption of the light having the above-described wavelength. Thus, a photopolymerization between a polymerization initiator and the photocuring agent 10 may be induced with a relatively low exposure amount and photopolymers 412 sufficient for providing pre-tilt may be form. For example, the exposure amount may be approximately 1 to 4 J/cm$^2$ or less. Furthermore, since the exposure amount and exposure time may be reduced, damage prevention of liquid crystal molecules in the liquid crystal layer 300 caused by light irradiation may be achieved. Although FIG. 9 depicts light being irradiated from the first substrate 100 side, the light may be irradiated from the second substrate 200 side or both first substrate 100 side and the second substrate 200 side.

When light is irradiated to the main alignment layer 411 including a polymerization initiator and an auxiliary light absorbing group, a photopolymerization reaction is initiated by the polymerization initiator to form the first alignment film 410 including the photopolymers 412 chemically bonded to the side chain of the polymer chain in the main alignment layer 411. The photopolymers 412 may include a polymeric compound in which single molecules of the photocuring agent 10 may be bonded to the vertical align group side chain and/or polymerization initiator side chain of the polymer chain. The single molecules of the photocuring agent 10 may polymerized with each other and the polymeric compound may be formed into a shape of micro protuberances on the surface of the main alignment layer. The decreased photocuring agent 10 in the liquid crystal layer 300 may be understood as being consumed in forming the photopolymers 412. For example, the photocuring agent 10 may be reactive mesogen, and the photopolymers 412 may be polymers of reactive mesogen.

Figure 10:
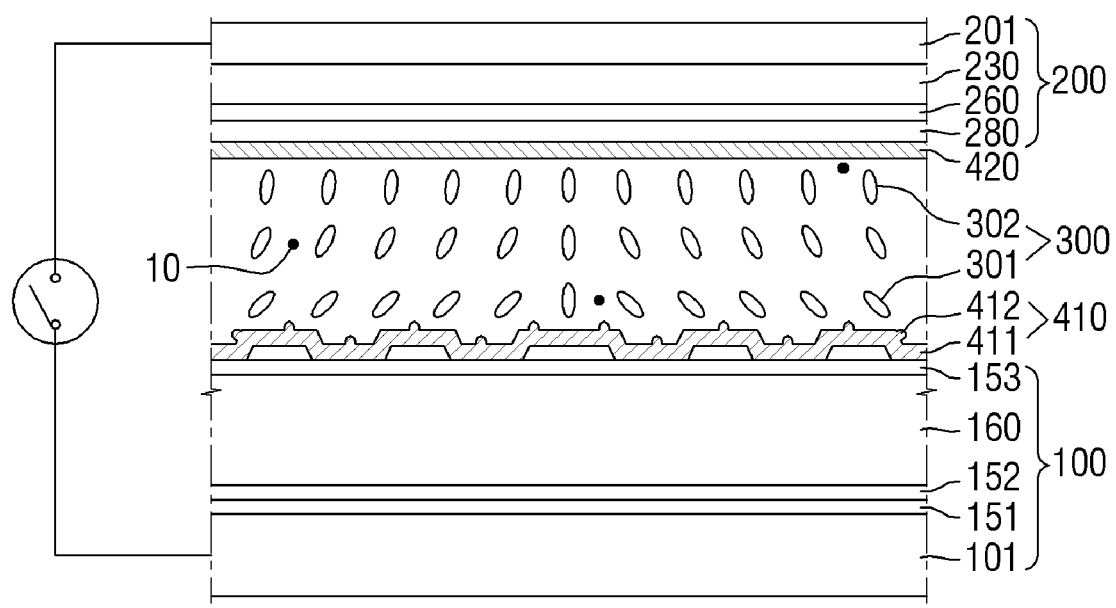

Referring to FIG. 10, the alignment direction of the first liquid crystal molecules 301 is fixed or stabilized by tilted photopolymers and thus the first liquid crystal molecules 301 maintain a pre-tilt angle even when no electric field is generated, while the second liquid crystal molecules 302 are substantially vertically aligned. In this case, the first liquid crystal molecules 301 may be approximately aligned with the first pre-tilt angle $\theta 1$ and the second liquid crystal molecules 302 may be approximately aligned with the second pre-tilt angle $\theta 2$, which is greater than the first pre-tilt angle $\theta 1$. For example, the liquid crystal molecules in the liquid crystal layer 300 may have an average pre-tilt angle of approximately 88.8° or less. However, exemplary embodiments not limited to an average pre-tilt angle of approximately 88.8° or less. The inventors envision any suitable average pre-tilt angle. The surface roughness of the first alignment film 410 may be greater than that of the second alignment film 420 due to the photopolymers 412 on the surface of the first alignment film 410.

Figure 11:
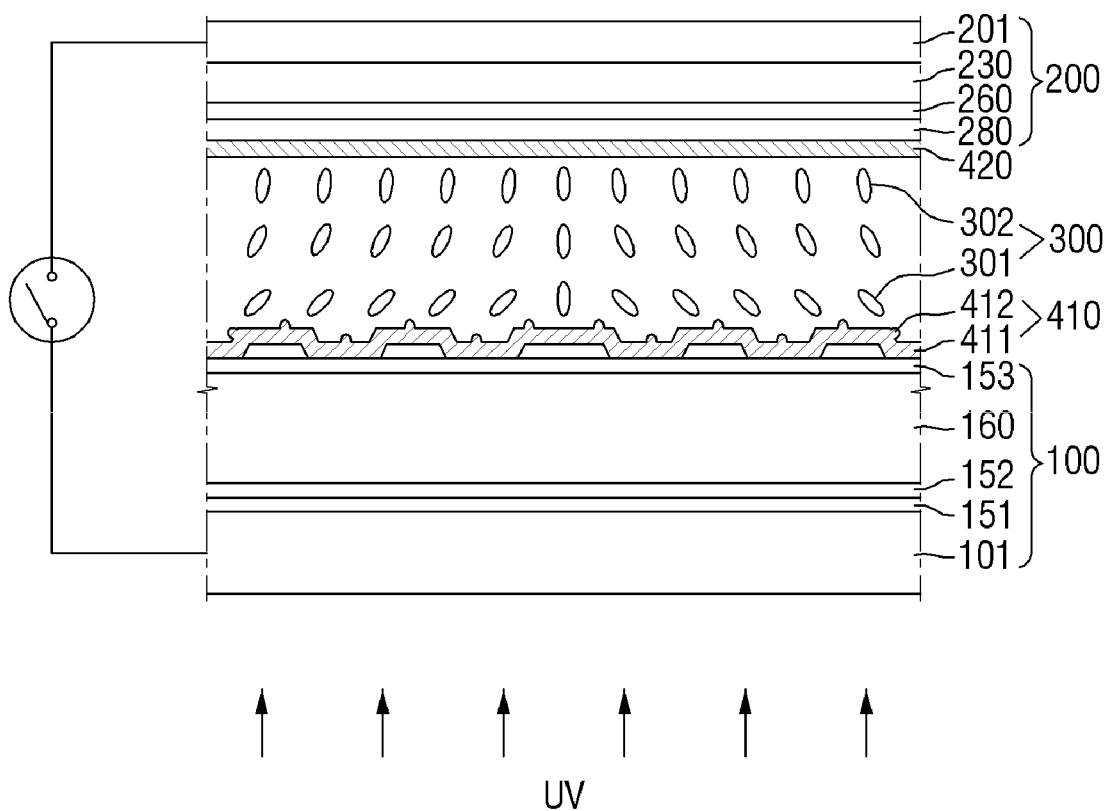

Referring to FIGS. 5 and 11, light may be irradiated again in the state where no electric field is applied (S170). The light may be an ultraviolet ray. When light is irradiated to the liquid crystal layer 300 containing the remaining photocuring agent 10, the remaining photocuring agent 10 may be removed from the liquid crystal layer 300. The light can be irradiated for a time period of approximately 120 minutes or less, or approximately 80 minutes or less. However, exemplary embodiments are not limited to these time periods. As the time period of the light irradiation becomes longer or the irradiation amount increases, more of the remaining photocuring agent 10 may be removed and the voltage holding ratio may be lowered due to damage to liquid crystal molecules.

The first alignment film 410 may have a side chain with an auxiliary light absorbing group introduced to side chain. Thus, the first alignment film 410 may exhibit high absorption efficiency to the wavelength of the light used in the step S170. That is, the first alignment film 410 having a side chain with an auxiliary light absorbing group introduced to the side chain may cause the remaining photocuring agent 10 to be removed with a short exposure time and small amount of irradiation. Accordingly, no after-image appears and the exposure time and the amount of irradiation may be reduced. Therefore, a liquid crystal display device having improved display quality may be obtained. For instance, the content of the photocuring agent 10 finally remaining in the liquid crystal layer 300 may be 100 ppm (parts per million) or less.

In the step S170 of irradiating light, the second liquid crystal molecules 302 may still be maintained at a state that is more vertical than the first liquid crystal molecules 301.

Subsequently, although not shown in the drawings, a curved liquid crystal display device can be obtained through the process of bending both ends of each of the first and second substrates 100 and 200 and the process of providing a backlight unit (not shown) beneath the first substrate 100. The method for manufacturing a liquid crystal display device according to the exemplary embodiment uses an alignment film including an auxiliary light absorbing group, thereby minimizing the exposure amount and exposure time of light in the above-described light irradiation steps.

A method for manufacturing a liquid crystal display device according to another exemplary embodiment will now be described. However, to avoid features of the inventive concept from becoming unclear, descriptions of elements substantially the same as or similar to those already described will be omitted for brevity.

Figure 12:
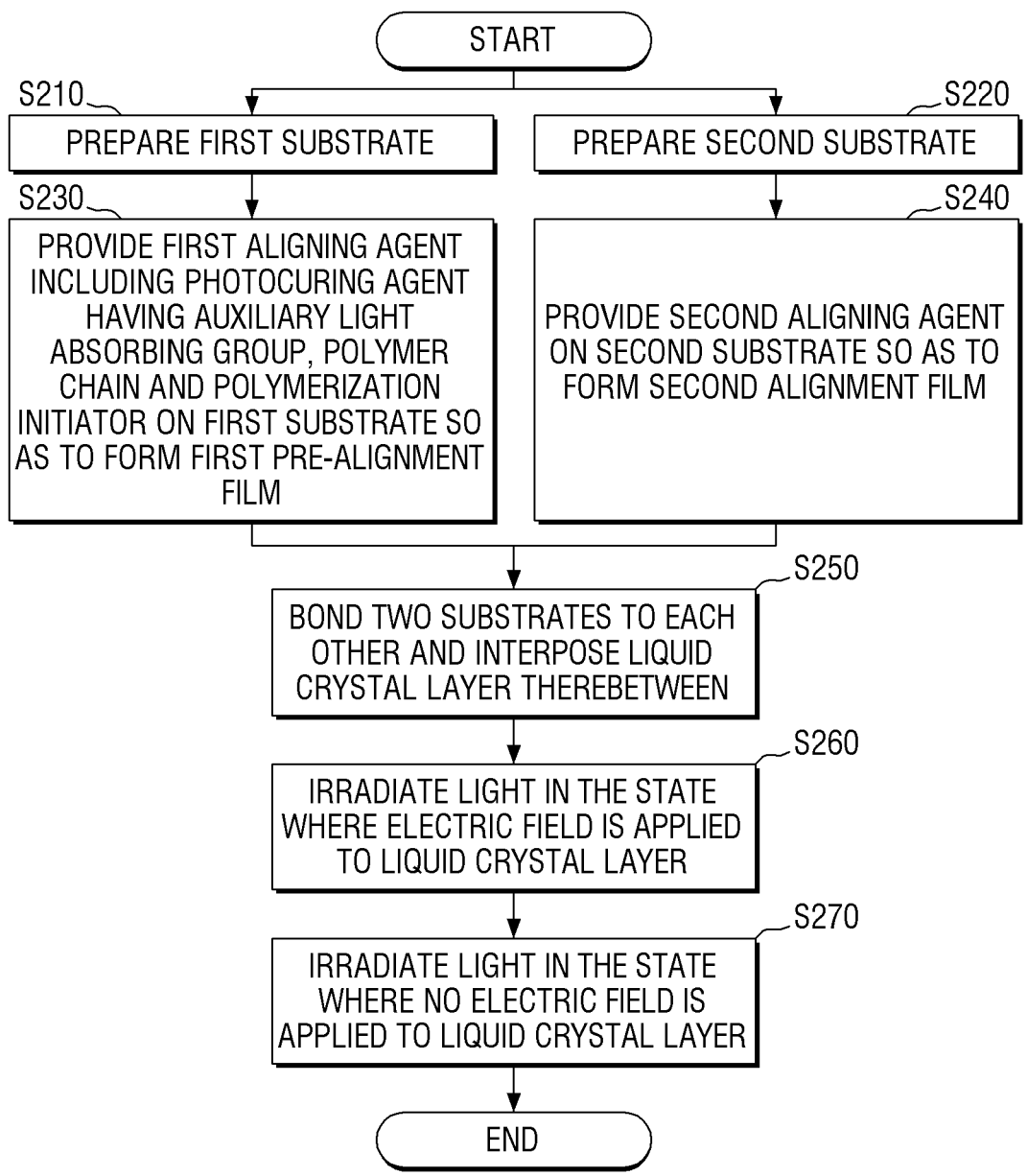
FIG. 12 is a flowchart illustrating process steps for manufacturing a liquid crystal display device according to an exemplary embodiment.

FIG. 12 is a flowchart illustrating process steps for manufacturing a liquid crystal display device according to an exemplary embodiment.

Referring to FIG. 12, a first substrate may be prepared (S210). A second substrate may be prepared (S220). The first substrate may be a lower display substrate and the second substrate may be an upper display substrate.

A first aligning agent may be provided on the first substrate to form a first pre-alignment film (S230). The first aligning agent may include a polymerization initiator, a photocuring agent, a predetermined amount of a solvent, and a polymer chain that is a copolymer of a dianhydride-based compound and a diamine-based compound. However, the polymer chain of the first aligning agent according FIG. 12 differs from that of the first aligning agent illustrated with reference to FIG. 5 in that the first aligning agent according to FIG. 12 does not include a side chain having an auxiliary light absorbing group introduced to the side chain or does not include side chain having a substantial amount of an auxiliary light absorbing group introduced to the side chain.

Instead, the photocuring agent may include an auxiliary light absorbing group at a center of the photocuring agent. The auxiliary light absorbing group may be a functional group including a biphenyl group or a terphenyl group. The photocuring agent may form photopolymers through a photopolymerization. For example, the photocuring agent may be a reactive mesogen and the photopolymers may be polymers of reactive mesogen.

The reactive mesogen may be a compound that includes a mesogen core structure having a mesogen group (rigid group) for expressing liquid crystal properties. The reactive mesogen may also have a polymerizable terminal group (reactive group) for polymerization. Thus, the reactive mesogen may include crosslinkable low molecules or macromolecules and may cause chemical reactions such as a polymerization reaction upon absorption of light and/or heat of a specific wavelength.

The rigid group may include a substituted or unsubstituted cyclohexyl, a substituted or unsubstituted biphenyl, a substituted or unsubstituted terphenyl, or a substituted or unsubstituted naphthalene. The polymerizable terminal group may include a methacrylate, a acrylate, a vinyl, a vinyloxy, or an epoxy. However, exemplary embodiments are not limited to the rigid groups or the polymerizable terminal groups listed in this paragraph. For example, the rigid group may be one among

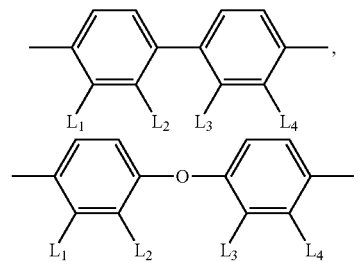

(wherein, each of $L_1$ to $L_4$ may independently be a hydrogen or a halogen, and either $L_1$ or $L_2$ may be a hydrogen, and either $L_3$ or $L_4$ may be a hydrogen),

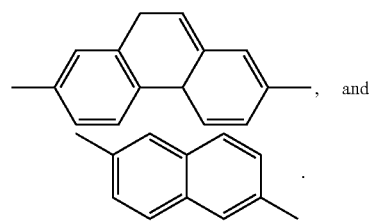

, and

Also as an example, the polymerizable terminal group may be one among

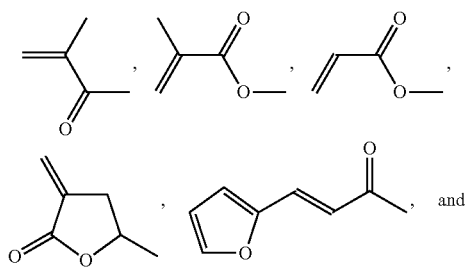

, and

-continued

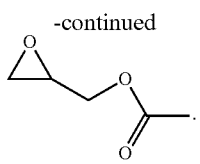

The photocuring agent may further include an auxiliary light absorbing group in addition to the rigid group in the mesogen core structure. The auxiliary light absorbing group may be a biphenyl group or a terphenyl group. The mesogen core structure including the rigid group and the auxiliary light absorbing group may maintain the chemical structure of the mesogen core even after a polymerization reaction. Thus, a first alignment film may be formed by polymerizing a polymerization initiator side chain and the reactive mesogen, and may include a side chain containing a biphenyl group or a terphenyl group.

In an exemplary embodiment, the photocuring agent includes the structure expressed by Chemical Formula IVA or Chemical Formula IVB described above.

The composition of the first aligning agent other than those described above may be substantially the same as that of the first aligning agent described with reference to FIG. 5. The first aligning agent may be cured to form a first pre-alignment film.

In the step of curing the first aligning agent to form the first pre-alignment film, at least a portion of the photocuring agent contained in the first aligning agent may be lost or may disappear through a thermal decomposition or thermal polymerization when the curing process is performed at a temperature of 200° C. or higher. A decrease in the content of monomers of the photocuring agent may lead to a decrease in an absolute amount of polymeric compounds of the photocuring agent. That is, photopolymers may result in insufficient pre-tilting of liquid crystal molecules. In addition, polymers of the photocuring agent thermally polymerized in the step S230 may not be further polymerized in the following step S260 or step S270. Thus, the photocuring agent may remain as impurities in a liquid crystal layer causing defects such as an after-image during an operation of a liquid crystal display device. The photocuring agent according to an exemplary embodiment has a mesogen core structure including a biphenyl group or a terphenyl group. The length of the mesogen core structure is elongated to resist against a thermal reaction and additional bonds are provided in the mesogen core structure, thereby achieving high thermal stability. Thus, the amount of the photocuring agent lost or disappeared through a thermal decomposition or thermal polymerization in the step S230 may be minimized.

A second aligning agent may be provided on a second substrate to form a second alignment film (S240). Step S240 is similar as step S140 of FIG. 5, and thus overlapping descriptions will be omitted for brevity.

The first substrate 100 and the second substrate 200 may be bonded to each other, and a liquid crystal layer 300 may be interposed between the first substrate 100 and the second substrate 200 (S250). The liquid crystal layer 300 may be interposed between the first and second substrates 100 and 200 through a liquid crystal dispensing process or a liquid crystal injection process.

Further, a light irradiation may be performed in the state where an electric field is applied to the liquid crystal layer 300 (S260). The light may be an ultraviolet ray having a wavelength of approximately 300 to 380 nm, a wavelength of approximately 350 to 380 nm, or a wavelength of approximately 355 to 370 nm. Furthermore, the light may be irradiated with an exposure amount of approximately 0.1 to 15 J/cm² or an exposure amount of approximately 1 to 4 J/cm² or less.

The photocuring agent may include an auxiliary light absorbing group, which may lead to high absorption of light having the above-described wavelength. Thus, a photopolymerization between a polymerization initiator and the photocuring agent may be induced with a relatively low exposure amount, and photopolymers sufficient for providing pre-tilt may be formed.

When light is irradiated to the first pre-alignment film including a polymerization initiator and to the photocuring agent having an auxiliary light absorbing group, a photopolymerization reaction may be initiated by the polymerization initiator and may be facilitated by the auxiliary light absorbing group to form a first alignment film including the photopolymers chemically bonded to the side chain of the polymer chain in the first pre-alignment film.

When the first alignment film including the photopolymers is formed, the alignment direction of the first liquid crystal molecules 301 may be fixed or stabilized. Thus, the first liquid crystal molecules 301 adjacent to the first alignment film may maintain a pre-tilt angle even when no electric field is generated and the second liquid crystal molecules 302 adjacent to the second alignment film may be substantially vertically aligned.

Subsequently, light may be irradiated in the state where no electric field is applied (S270). The light may be an ultraviolet ray. When light is irradiated to the liquid crystal layer 300 containing the remaining photocuring agent, the remaining photocuring agent may be removed from the liquid crystal layer 300. Specifically, since the remaining photocuring agent may have an auxiliary light absorbing group contained in the mesogen core structure, the photocuring agent may exhibit high absorption efficiency to the wavelength of the light used in the step S270. Thus, most of the remaining photocuring agent may be removed with a short exposure time and small amount of irradiation and no after-image appears.

Subsequently, although not shown in the drawings, a curved liquid crystal display device can be obtained through the process of bending both ends of each of the first and second substrates and the process of providing a backlight unit beneath the first substrate. The method for manufacturing a liquid crystal display device according to the exemplary embodiment may use a photocuring agent including an auxiliary light absorbing group contained in a mesogen core structure, thereby minimizing the exposure amount and exposure time in the above-described light irradiation steps. The method may also use a photocuring agent with improved thermal stability to minimize loss of the photocuring agent caused by a thermal reaction in the step of curing an aligning agent.

According to an exemplary embodiment, liquid crystal molecules adjacent to an upper substrate have an aligned direction that is more vertical than liquid crystal molecules adjacent to a lower substrate, thereby improving light transmittance and minimizing a texture caused by a misalignment.

According to an exemplary embodiment, an alignment film having a side chain with an auxiliary light absorbing group introduced to the side chain is used, thereby reducing exposure time and exposure amount of light for providing pre-tilt to liquid crystal molecules and efficiently forming photopolymers at a surface of the alignment film when manufacturing a liquid crystal display device.

According to an exemplary embodiment, a photocuring agent with improved thermal stability is used when manufacturing a liquid crystal display device, thereby minimizing an undesired loss of the photocuring agent caused by a thermal reaction.

Furthermore, According to an exemplary embodiment, a photocuring agent has the auxiliary light absorbing group to have improved light absorptivity, thereby improving processability and preventing defects such as after-image or degradation in voltage holding ratio caused by the photocuring agent remaining in a liquid crystal layer.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device, comprising:
a first substrate having a first domain including a first curved surface and a second domain including a second curved surface, the first curved surface being symmetrical with the second curved surface;
a first alignment film disposed on the first substrate, the first alignment film comprising a polymerization initiator and a photocuring agent;
a second substrate facing the first substrate; and
a liquid crystal layer disposed between the first alignment film and the second substrate, wherein the liquid crystal layer includes first liquid crystal molecules in the first domain and second liquid crystal molecules in the second domain, the first liquid crystal molecules and the second liquid crystal molecules having different alignment directions symmetrically aligned to each other,
wherein the first alignment film comprises a polymer chain that is a copolymer of a dianhydride-based compound and a diamine-based compound, the polymer chain comprising:
a main chain comprising a repeating unit comprising an imide group, a first side chain bonded to the main chain, the first side chain comprising a vertical align group; and
a second side chain bonded to the main chain, the second side chain comprising a first light absorbing group comprising a first biphenyl group or a first terphenyl group,
wherein the polymerization initiator and the photocuring agent are polymerized to form a photopolymer,
wherein the photocuring agent is a reactive mesogen and comprises a second light absorbing group comprising a second biphenyl group or a second terphenyl group that is included in a mesogen core structure,
wherein the first side chain is different in chemical structure from the second side chain, and
wherein the first side chain and the second side chain are different in chemical structure from the photopolymer.

2. The liquid crystal display device of claim 1, wherein:
the liquid crystal layer comprises a plurality of liquid crystal molecules, and
a first liquid crystal molecule adjacent to the second substrate has a aligned direction that is more vertical than a second liquid crystal molecule adjacent to the first alignment film in an initial alignment state.

3. The liquid crystal display device of claim 1, further comprising a second alignment film disposed between the second substrate and the liquid crystal layer,
wherein a content of a polymerization initiator of the second alignment film is at least one of zero and less than a content of the polymerization initiator of the first alignment film.

4. The liquid crystal display device of claim 3, wherein:
the first alignment film comprises photopolymers, and
a content of photopolymers per unit area of the second alignment film is at least one of zero and less than a content of the photopolymers per unit area of the first alignment film.

5. The liquid crystal display device of claim 4, wherein the first alignment film has a surface roughness greater than the second alignment film.

6. The liquid crystal display device of claim 1, wherein the polymer chain has a repeating unit comprising:
a first structure expressed by Chemical Formula IA or Chemical Formula IB; and
a second structure expressed by Chemical Formula IIA or Chemical Formula IIB,

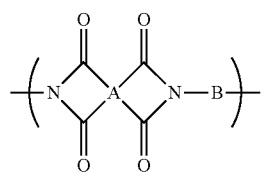

(Chemical Formula IA)

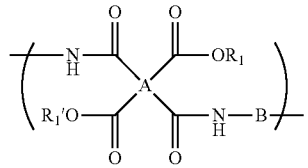

(Chemical Formula IB)

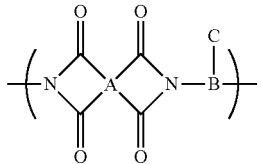

(Chemical Formula IIA)

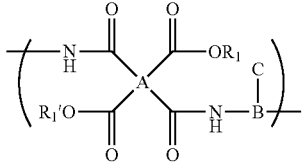

(Chemical Formula IIB)

wherein in Chemical Formula IA, Chemical Formula IB, Chemical Formula IIA, and Chemical formula IIB, A is independently a tetravalent organic group derived from a cycloaliphatic dianhydride or an aromatic dianhydride, and B is independently a divalent organic group derived from a cycloaliphatic diamine or an aromatic diamine,
wherein in Chemical Formula IB and Chemical Formula IIB, each of $R_1$ and $R_1'$ is independently a hydrogen, a substituted or unsubstituted alkyl, or a substituted or unsubstituted aryl, and
wherein in Chemical Formula IIA and Chemical Formula IIB, C is the vertical align group or the first light absorbing group comprising the first biphenyl group or the first terphenyl group.

7. The liquid crystal display device of claim 6, wherein the vertical align group comprises a third structure expressed by Chemical Formula IIC or Chemical Formula IID,

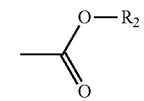
(Chemical Formula IIC)

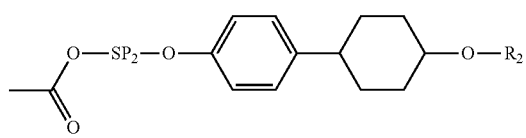
(Chemical Formula IID)

wherein in Chemical Formula IIC and Chemical Formula IID, $R_2$ is an alkyl group having 3 to 25 carbon atoms, and wherein in Chemical Formula IID, $SP_2$ is a single bond or an alkyl group having 1 to 5 carbon atoms.

8. The liquid crystal display device of claim 6, wherein the first light absorbing group comprises a fourth structure expressed by Chemical Formula IIIC or Chemical Formula IIID,

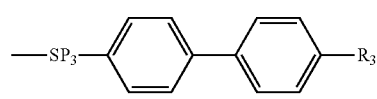
(Chemical Formula IIIC)

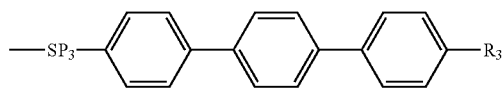
(Chemical Formula IIID)

wherein in Chemical Formula IIIC and Chemical Formula IIID, $R_3$ is an alkyl or aryl having 2 to 10 carbon atoms, and $SP_3$ is an ether group or an ester group.

9. The liquid crystal display device of claim 6, wherein the photocuring agent comprises a fifth structure expressed by Chemical Formula IVA or Chemical Formula IVB,

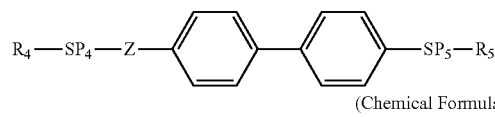
(Chemical Formula IVA)

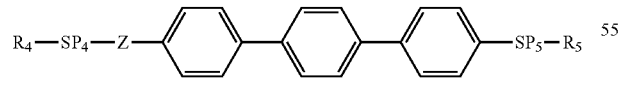
(Chemical Formula IVB)

wherein in Chemical formula IVA and Chemical Formula IVB, each of $R_4$ and $R_5$ is independently a methacrylate group, an acrylate group, a vinyl group, a vinyloxy group, or an epoxy group, each of $SP_4$ and $SP_5$ is independently a single bond, an alkyl group having 1 to 12 carbon atoms, or an alkoxy group having 1 to 12 carbon atoms, and Z is a rigid group comprising a cycloaliphatic or aromatic hydrocarbon having 6 to 18 carbon atoms.

10. The liquid crystal display device of claim 1, wherein the liquid crystal layer comprises another photocuring agent comprising a sixth structure expressed by Chemical Formula IVA or Chemical Formula IVB, and the another photocuring agent in the liquid crystal layer has a content of approximately 100 ppm (parts per million) or less,

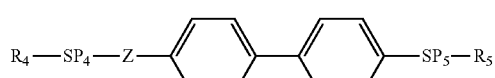
(Chemical Formula IVA)

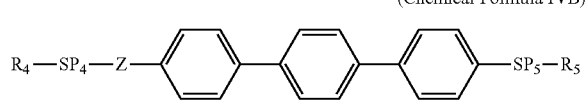
(Chemical Formula IVB)

wherein in Chemical Formula IVA and Chemical Formula IVB, each of $R_4$ and $R_5$ is independently a methacrylate group, an acrylate group, a vinyl group, a vinyloxy group, or an epoxy group, each of $SP_4$ and $SP_5$ is independently a single bond, an alkyl group having 1 to 12 carbon atoms, or an alkoxy group having 1 to 12 carbon atoms, and Z is a rigid group comprising cycloaliphatic or aromatic hydrocarbon having 6 to 18 carbon atoms.

11. The liquid crystal display device of claim 1, wherein:
the first substrate comprises a first base substrate and a pixel electrode disposed between the first base substrate and the first alignment film,
the pixel electrode having split domains, and
the second substrate comprises a second base substrate and a common electrode disposed between the second base substrate and the liquid crystal layer.

12. The liquid crystal display device of claim 1, wherein the surface of the first substrate and the surface of the second substrate curved in the first direction have a concave shape.

13. A method for manufacturing a liquid crystal display device, comprising:
forming a first pre-alignment film on a first substrate, the first pre-alignment film comprising a main alignment layer, a polymerization initiator and a photocuring agent;
forming a second alignment film on a second substrate;
disposing a liquid crystal layer between the first pre-alignment film and the second alignment film;
bonding the first substrate and the second substrate to each other; and
irradiating light on the main alignment layer when an electric field is applied to the liquid crystal layer to form a first alignment film having photopolymers on the main alignment layer,
wherein a content of a polymerization initiator in the second alignment film is at least one of zero and less than a content of a polymerization initiator in the first pre-alignment film,
wherein the first alignment film comprises a polymer chain that is a copolymer of a dianhydride-based compound and a diamine-based compound, the polymer chain comprising:
a main chain comprising a repeating unit comprising an imide group, a first side chain bonded to the main chain, the first side chain comprising a vertical align group; and a second side chain bonded to the main chain, the second side chain comprising a first light absorbing group comprising a first biphenyl group or a first terphenyl group;

wherein the polymerization initiator and the photocuring agent are polymerized to form a photopolymer, wherein the photocuring agent is a reactive mesogen and comprises a second light absorbing group comprising a second biphenyl group or a second terphenyl group that is included in a mesogen core structure, wherein the first side chain is different in chemical structure from the second side chain, and wherein the first side chain and the second side chain are different in chemical structure from the photopolymer;

wherein the first substrate has a first domain including a first curved surface and a second domain including a second curved surface, the first curved surface being symmetrical with the second curved surface; and wherein the liquid crystal layer includes first liquid crystal molecules in the first domain and second liquid crystal molecules in the second domain, the first liquid crystal molecules and the second liquid crystal molecules having different alignment directions which are symmetrically aligned to each other.

14. The method of claim 13, wherein forming the first pre-alignment film on the first substrate comprises:
disposing a first aligning agent on the first substrate; and
curing the first aligning agent to form the first pre-alignment film,
wherein the first aligning agent comprises the polymerization initiator and the polymer chain.

15. The method of claim 13, wherein:
the first alignment film is formed by polymerizing the polymerization initiator and the photocuring agent, and
the photocuring agent comprises a first structure expressed by the Chemical Formula IVA or Chemical Formula IVB, (Chemical Formula IVA)

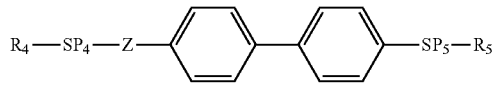

(Chemical Formula IVB)

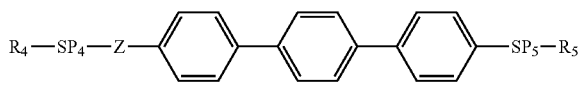

wherein in Chemical Formula IVA and Chemical Formula IVB, each of $R_4$ and $R_5$ is independently a methacrylate group, an acrylate group, a vinyl group, a vinyloxy group, or an epoxy group, each of $SP_4$ and $SP_5$ is independently a single bond, an alkyl group having 1 to 12 carbon atoms, or an alkoxy group having 1 to 12 carbon atoms, and Z is a rigid group containing cycloaliphatic or aromatic hydrocarbon having 6 to 18 carbon atoms.

16. The method of claim 13, wherein the first alignment film is formed by:
polymerizing a photocuring agent contained within the first pre-alignment film, or
discharging the photocuring agent to the liquid crystal layer and polymerizing the photocuring agent contained within the liquid crystal layer.

17. The method of claim 13, wherein the first pre-alignment film is irradiated with approximately 4 $J/cm^2$ or less of ultraviolet light having a wavelength of approximately 355 nanometer (nm) to 365 nm.

18. The method of claim 13, further comprising:
irradiating the first alignment film when the electric field is not applied to the liquid crystal layer,
wherein the first alignment film is formed after irradiating the light when the electric field is applied to the liquid crystal layer.

19. The method of claim 18, wherein the first alignment film is irradiated with ultraviolet light rays for approximately 80 minutes or less, and the liquid crystal layer comprises a content of the photocuring agent that is approximately 100 ppm or less.

20. The method of claim 18, wherein:
the first alignment film has a surface roughness greater than the second alignment film, and
an average pre-tilt angle of liquid crystal molecules of the liquid crystal layer is approximately 88.8° or less.

* * * * *